United States Patent [19]

Fernandes et al.

[11] Patent Number: 5,379,320
[45] Date of Patent: Jan. 3, 1995

[54] HITLESS ULTRA SMALL APERTURE TERMINAL SATELLITE COMMUNICATION NETWORK

[75] Inventors: Roosevelt A. Fernandes, Chino Hills, Calif.; Kurt P. Krabbe, Bountiful, Utah

[73] Assignee: Southern California Edison Company, Rosemead, Calif.

[21] Appl. No.: 29,897

[22] Filed: Mar. 11, 1993

[51] Int. Cl.[6] ............................................. H04L 9/00
[52] U.S. Cl. ...................................................... 375/1
[58] Field of Search ............................. 375/1; 342/352

[56] References Cited

U.S. PATENT DOCUMENTS 4,901,307 2/1990 Gilhousen et al. .................... 375/1

Primary Examiner—David C. Cain
Attorney, Agent, or Firm—Merchant, Gould, Smith, Edell, Welter & Schmidt

[57] ABSTRACT

A satellite communication system between a hub terminal and remote terminals simultaneously uses two or more satellites for communication. Rapid signal acquisition for mobile terminals is achieved by incorporation of a Global Positioning System receiver to establish initial frequency and time references. High resolution time distribution is provided by use of spread spectrum coded signals. A combined Time Division Multiple Access/Code Multiplex architecture receives simultaneous signals of widely varying signal strengths. Rapid and numerous changes to the polling sequence is possible. The hub terminal incorporates two high directivity antennas each illuminating a separate geostationary satellite transponder with a spread spectrum coded signal, each orthogonal to the other. The remote terminals employ an antenna of sufficiently small aperture to enable simultaneous reception of both orthogonal transponder signals. Each remote terminal transmits one signal that illuminates both satellite transponders and is received separately by each hub terminal antenna. All transmissions are synchronized to a precision time frame and are spread spectrum encoded. Multiple remote terminals may transmit simultaneously using orthogonal codes. Block addressing reduces the data bandwidth of the hub terminal. The network architecture allows numerous blocks to be established, each block containing any number of remote terminals and each remote terminal may be assigned to be a member numerous blocks. A single command issued by the hub terminal to a particular block, thereby addresses the multiple remote terminals which are members of that block. In order to demodulate the data received from multiple remote terminals, the hub terminal generates a numerical database that fully represents the composite received signal. Iterative digital signal processing is performed in real-time to establish the code phase of each remote terminal. Initial processing of the database demodulates only strong signals. In an iterative manner, the successfully demodulated signals are subtracted from the database and processing is reperformed to extract the weaker signals.

117 Claims, 11 Drawing Sheets

HITLESS ULTRA SMALL APERTURE TERMINAL SATELLITE COMMUNICATION NETWORK

BACKGROUND

Providing effective and reliable communication between multiple terminals through satellites is important.

This invention relates to satellite communication networks particularly for passing information from a hub terminal to ensure control and regulation of remote equipment.

Problems related to known satellite communication systems include the following:

(1) A concern for critical applications using satellite communications includes the loss of communication due to failure of the satellite transponder system. Typically, such systems incorporate redundancy by means of terrestrial communications or dual implementation of the earth station terminals at each site combined with the use of a second satellite transponder. These approaches are not economically viable for satellite communication systems involving numerous, unmanned remote terminals.

This problem has limited the use of satellite-based communications in critical applications such as Supervisory, Control And Data Acquisition (SCADA) networks. SCADA networks are used for example by electric utilities; to issue control commands and collect operational data from electric generation and distribution equipment. The network may contain a thousand or more remote terminals. While failure of a single remote terminal node is tolerable, failure of the satellite equipment in a nonredundant network is unacceptable. This would result in the total loss of command and control for the long period of time required to retune each remote terminal to a new transponder frequency and reset the antenna position to align with the new satellite.

In addition to equipment failures, loss of communication occurs when the sun lies on the line of site formed by the location of the earth terminal and the satellite. The sun's radiation causes the terminal's receiver noise level to increase and interfere with reception of the satellite's signal. The sun's adverse impact on signal reception is greatest for hub terminals which typically employ a high gain antenna, i.e. beamwidth less than one degree. Presently, communication systems which cannot tolerate loss of communication due to the sun, utilize two hub terminals, geographically separated by typically 1,000 miles or more, in order that the line-of-side to the satellite be sufficiently different for each hub terminal such that the sun will only interfere with one hub terminal at a time. The geographical separation necessitates an additional communication link to bring the data to the desired centralized facility. The redundant hub at the same site only requires a second antenna and not duplicate electronics.

(2) The time required to acquire the satellite signal and commence useful communications is prohibitively long for mobile terminals employing spread spectrum coded signals and moderate to high antenna gains. Spread spectrum is used to artificially increase the bandwidth of the transmitted signal relative to the bandwidth required to transmit the information. This technique reduces the power spectral density i.e. power per unit bandwidth of the transmitted signal. The FCC regulates the maximum allowable spectral density utilized by each satellite communication system in order to control the interference imposed on other systems. Non-spread spectrum systems utilize the transmissions of symbol bits which are related to the information data. The direct sequence approach to spread spectrum entails subdividing each symbol bit into a pseudo random sequence of bits, termed chips. The polarity of the sequence, hence the chips, is determined by the polarity of the symbol bit. The receiver can de-spread the transmitted signal, i.e. remove the pseudo random sequence, provided it has a apriori knowledge of the sequence. The de-spread process consists of the cross-correlation of the known sequence with the received signal. The signal is extracted only when known sequence is aligned with the sequence embedded with the signal. The alignment of the sequence is termed code phase.

A typical antenna for a mobile terminal provides a 4° azimuth beamwidth and a broad elevation beamwidth encompassing the total range of expected elevation angles to the satellite. To cover 360° of azimuth requires a minimum of 90 azimuth positions. During acquisition, these azimuth positions must be scanned to ascertain the presence of the satellite signal. At each azimuth position, the receiver frequency needs to be stepped and searched to ascertain the correct setting. The frequency search is required to compensate for doppler shift and inaccuracies in the local frequency reference of the mobile terminal. Depending on the terminal design, approximately 50 frequency steps are usually required.

Finally, at each antenna azimuth position and frequency setting, the spread spectrum signal must be scanned to establish the correct code phase. For a typical code length of 255 chips, this entails testing 255 phases. Signal acquisition involves a three dimensional search i.e. azimuth, frequency, and code phase. For the terminal described, there are 1,147,500 (90×50×255) possible combinations. At a nominal time of one millisecond to test one combination, the acquisition process could take 1,147 seconds. For most applications, this time is too long.

Presently mobile systems rely either on the transmission of sufficient power to allow the use of an antenna with a gain below 6 dB and a sufficiently broadbeam antenna pattern as not to require a directional search. Alternatively, a time division multiple access is used in combination with a moderate gain antenna with a search in azimuth and frequency, but not in code phase.

These systems require power spectral densities that exceed the standard FCC regulations regarding fixed-site satellite communication systems. Accordingly, special licensing as a mobile system is required.

(3) For SCADA networks and other satellite communication systems, it is desirable to provide a time distribution function at approximately one microsecond resolution in addition to the two-way data transfers. Up to the present, the time distribution resolution has been determined by the data communication rate. For low data rate systems, the time resolution has been inadequate. For example, at 9.2 kbps the nominal resolution will be worse than 100 microseconds. A satellite communication system is needed to provide time distribution at high resolution independent of the data rate.

(4) Code multiplexing, is presently inefficient when used for transfer of short bursts of data. Code multiplexing is an extension of spread spectrum technology. For direct sequence, spread spectrum, multiple signals are transmitted at the same time and at the same frequency, but using different code sequences. The de-spread process, used by the receiver, rejects all signals except the one with the matching code. Multiple de-spread processes may be performed using each of the expected code sequences to extract all the signals.

Typical SCADA networks require one second transmissions from each remote terminal. De-spread of code multiplex signals requires a nominal 0.25 seconds for code phase and frequency determination. This results in a 25% loss in useful utilization of the communication link.

Code acquisition time is currently reduced through the use of special large scale integrated circuits called spread spectrum matched filters. These circuits can establish the correct code phase within the receipt of one complete code sequence. Although these circuits do provide rapid code phase acquisition, they involve complex circuitry and are expensive. Also the frequency acquisition process remains unimproved. Elimination of the time to acquire the spread spectrum code phase and frequency would significantly enhance the use of code multiplexing.

(5) A limitation of code multiplexing is the inability to demodulate one or several relatively weak signals in the presence of multiple, comparatively strong signals. This results from the non-zero cross-correlation between the spread spectrum encoded signals. The strong signals have the effect of increasing the apparent noise level to a value too high for processing the weak signal.

The reduction in signal level results from many causes including attenuation due to heavy precipitation. For SCADA networks, the transmissions from a remote terminal located within a thunderstorm would be masked by transmissions from remote terminals in clear weather. In this case, the most important data could be lost.

A method of dealing with this problem has been the incorporation of power equalization circuitry. In such systems, the terminal monitors the strength of received signals, either its own signal returned by the satellite or another terminal's signal. The transmit power is adjusted based on the signal strength. This is based on the assumption that all variations in signal strength are due to atmospheric and weather conditions. This approach involves significant increases in terminal complexity and cost.

Recent efforts have focused on the development of spread spectrum cedes producing lower cross-correlations. This should provide a moderate increase in the dynamic range of received signals with only a small increase in cost and complexity.

A system architecture and processing methodology is needed which substantially enhances the ability to process code multiplexed signals of widely varying amplitude.

(6) SCADA networks typically utilize a polling method to determine which remote terminals are to transmit. Two polling methods are used: one is a fixed sequence method, and the other method is real-time control.

In the filmed sequence method, each remote terminal is assigned a time slot. The time slots may be altered by means of commands transmitted by the hub terminal. The advantage of the fixed sequence method is the amount of data required to be transmitted by the hub terminal to the remote terminals is low provided that the established polling sequence is not altered. In order to retain the benefits of low data rate transmissions by the hub terminal, a long period of time is required to implement significant changes to the polling sequence. For this reason, the fixed sequence method is not suitable for networks requiring rapid and numerous variations in the polling sequence. Such networks must use the real-time control polling method.

By this method, the hub terminal transmits a command to each remote terminal to request the remote terminal to transmit data. This requires the transmission of a large amount of data by the hub terminal with an attendant increase in network costs.

A polling method is needed which achieves rapid and numerous changes to the polling sequence yet does not impose a high transmit data rate requirement on the hub terminal.

In general, a disadvantage of the polling method is the occurrence of an emergency or high priority event at a remote terminal will not be transmitted to the hub terminal until requested by the hub terminal by the normal polling sequence. A single catastrophic event may cause an emergency situation to exist simultaneously at numerous remote terminal sites.

A method is needed to allow remote terminals to immediately notify the hub terminal of a local emergency condition and to prevent numerous simultaneous notifications from interfering with one another.

The polling method, used by SCADA networks, retrieves data on a periodic basis at an interval too long to enable detailed analysis of intervening transient events. Continuously recording data, at the rapid rate suitable for detailed analyses, between network polls is cost prohibitive since the quantity of data required for detailed analysis is an order of magnitude higher than for normal SCADA operation. For example, detailed analysis of an electrical transient would require a measurement every 100 microseconds at 12 bit resolution starting one second before the event and continuing through one second after the event. Continuous recording and retrieval of this data requires a 120,000 bps network throughput allocated to this individual remote terminal. This exceeds the data rate capacity of typical SCADA networks which are limited to 10,000 bps or less per remote terminal.

A method is needed which provides the rapid measurements associated with detailed transient analyses, yet maintains the average data rate within the capacity of conventional SCADA networks.

(7) The installation of numerous remote terminals is presently expensive and time consuming. The antenna of the remote terminal needs to be aligned to the direction of the satellite. Coarse antenna alignment is accomplished using surveying equipment. This is followed by fine adjustments; to maximize signal strength. Cables need to be constructed, routed and secured to provide a data interface between site equipment and the remote terminal. An equivalent cabling process is needed to bring electrical power to the remote terminal.

A remote terminal method is needed which eliminates or automates the installation process.

SUMMARY

The present invention minimizes the problems associated with satellite communication systems. According to the invention, a communication system and method is provided which operates with one or more of the following characteristics.

(1) A remote terminal method is applied which enables a single remote terminal to communicate by means of at least two separate satellites. An operational satellite is selected without external assistance. The remote terminals use an antenna beamwidth sufficiently broad to illuminate multiple satellites. A spread spectrum technology achieves a redundant satellite communication system. Operation continues without retuning and realignment in the event of a partial or total satellite failure. A separate hub antenna is used to communicate with each of the satellites. Since the line-of-site to each of the satellites is sufficiently different, the sun's radiation can impact only one of the hub antennas at a time, independent of the geographical separation between the hub antennas.

(2) Spread spectrum technology provides a communication system within the standard FCC regulations for fixed-sites. A predominately fixed-site communication network is provided having a mixture of fixed and mobile terminals. Spread spectrum coded signals and moderate to high antenna gains in mobile remote terminals are used. Signal acquisition time can be reduced by at least one order of magnitude through the incorporation of a Global Position System (GPS) receiver to provide an initial frequency and time reference. This achieves signal acquisition within approximately 10 seconds.

(3) Time distribution at high resolution, nominally one microsecond, is achieved independently of communication rate by means of a combined Time Division Multiple Access (TDMA) and spread spectrum architecture. In the context of this invention, TDM/refers to the transmission of multiple signals at the same frequency and using the same spread spectrum code sequence, but at a precise time sequence to prevent the signals from interfering with one another. TDMA provides coarse time resolution equivalent to the duration of the symbol bit. The spread spectrum signal provides fine resolution at the chip level.

(4) A combined TDMA and spread spectrum architecture achieves code multiplexing with no loss of communication time associated with signal acquisition. All remote terminals transmit synchronously and for a fixed duration time frame. The hub terminal receiver digitizes all data for the frame and digital signal processors operate on this data set until all data are extracted.

(5) The same combined TDMA and spread spectrum architecture enables reception of code multiplexed signals with widely varying signal strength through a successive elimination process. Initial decoding of the data set per frame results in extraction of the stronger signals. A second data set is generated wherein each of the extracted signals has been subtracted from the original data set. The extraction and subtraction process is continued iteratively until all signals are recovered.

(6) A block assignment polling method achieves rapid changes in polling sequence yet retains low data rate transmissions from the hub terminal. Hub terminal data transmissions assign individual remote terminals to be members of blocks. Any number of remote terminals may be a member of a particular block. An individual remote terminal may be assigned to be a member of numerous blocks. A single command may be issued by the hub terminal to a particular block to activate a selected group of remote terminals.

(7) Using the spread spectrum architecture, in combination with time multiplexing, enables each remote terminal to transmit an emergency notification independent of the polling sequence without the possibility of one emergency notification interfering with the transmission of another emergency notification. The emergency notifications are code multiplexed with the normal data transmissions. The emergency notifications are further subdivided into multiple time slots per frame to increase capacity through reuse of the spread spectrum codes.

(8) A programmable size stack storage methodology in combination with dynamically definable triggers enables retrieval of rapidly collected data surrounding the occurrence of a transient event. The lower average data rate associated with normal SCADA network data monitoring and control is maintained.

(9) Installation uses electromagnetic coupling, in the infrared or radiowave spectrums, for data interface between the site equipment and the remote terminal. Induction coupling from nearby power transmissions lines is used to eliminate all cabling associated with installation. Antenna alignment uses self-steering antennas within the remote terminals or automated installation equipment which automatically rotates the entire remote terminal to achieve alignment.

The invention is now further described with reference to the accompanying drawings.

DRAWINGS

DESCRIPTION

Satellite Communication System

Figure 1:
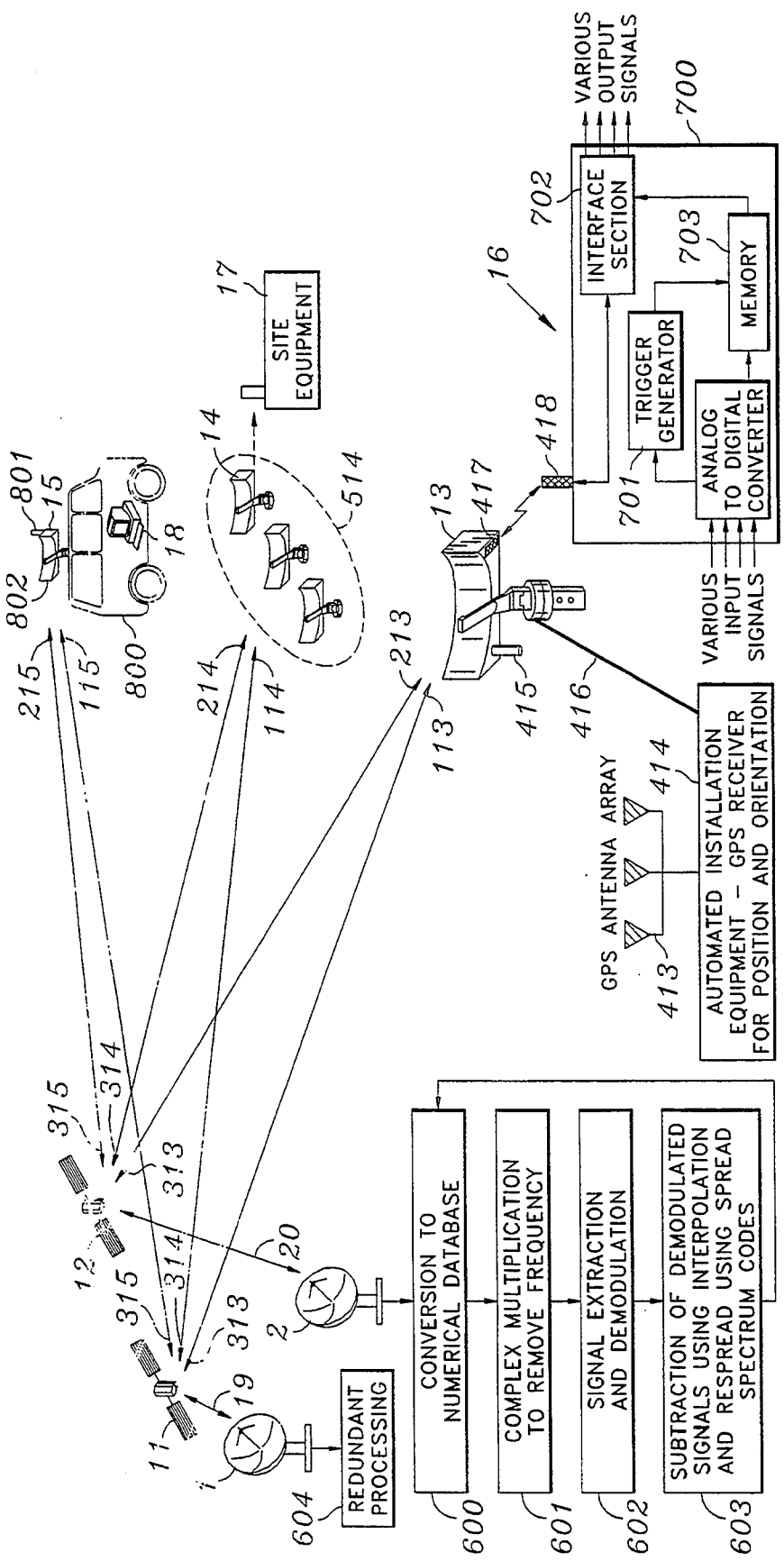
FIG. 1 is a top level communication system configuration.

A hub terminal consists of two large antennas 1 and 2 with sufficient directivity to illuminate one of two closely spaced geostationary repeater satellites. The two satellites are spaced 2° apart within the equatorial plane. Hub terminal antenna 1 illuminates satellite 11 and hub terminal antenna illuminates satellite 12. The communication network consists of multiple remote terminals 13, 14 and 15. The remote terminals have antennas with an antenna aperture sufficiently small to allow receipt of the signal from both satellites 11 and 12.

The azimuth beamwidth is nominally 3°. The remote terminal antennas are aligned to point directly between the two satellites 11 and 12. Each remote terminal 13, 14 and 15 is related to respective site equipment 16, 17 and 18.

The two hub terminal signals are transmitted by the two antennas 1 and 2 simultaneously at the same frequency. The hub terminal encodes each signal 19 and 20 using a direct sequence spread spectrum coding method. The codes for signal 19 and 20 are orthogonal to one another. The remote terminals 13, 14 and 15 de-spread both spread spectrum signals, but only one at a time. The remote terminals 13, 14 and 15 normally de-spread the signals 113, 114, and 115 from satellite 11. Datum is transmitted to each remote terminals 13, 14 and 15 to provide the time difference to signals 213, 214, and 215 respectively. Upon loss of signals 113, 114, and 115 from satellite 11, the remote terminals automatically commence de-spread of signals 213, 214, and 215 which are sent from satellite 12. Therefore, communication from the hub terminal to the numerous remote terminals 13, 14 and 15 continues with essentially no interruption even in the event of a total satellite failure. No retuning of frequency or realignment of antennas are required.

The reverse communication link, that is the communication 313, 314, and 315 from the remote terminals 13, 14 and 15 to the hub terminal, is also redundant. All remote terminals are tuned to the same frequency and generate spread spectrum encoded signals. The frequency is offset from that of the hub terminal transmissions to reduce interference between the two links. Up to 50 remote terminals transmit simultaneously, each assigned a different code sequence, each orthogonal to the others. The signals 313, 314, and 315 emanating from the remote terminals 13, 14 and 15 illuminate both satellites 11 and 12 and the signals are received at the hub terminal on both antenna 1 and antenna 2 from satellites 11 and 12 respectively. Total loss of a single satellite would not cause an interruption in communication for the reverse link. The hub terminal de-spreads and separates the signals from the 50 remote terminals using code multiplexing technology.

Since satellite 11 and 12 are separated by two degrees, the line-of-site from hub terminal 1 to satellite 11 differs from the line-of-site from hub terminal 2 to satellite 12 by at least approximately two degrees independent of the geographical separation between hub terminal 1 and hub terminal 2. The line-of-site to the sun can only coincide with the line-of-site to the satellite for one of the hub terminals at any time. The loss of communication due to interference by the sun is overcome without the need to geographically separate the redundant hub terminal equipment.

Direct Sequence Spread Spectrum

Since the remote terminal antennas 13, 14 and 15 are broadbeam, consideration is given to signal power requirements, susceptibility to interference from other systems and interference imposed on other systems.

Figure 2:
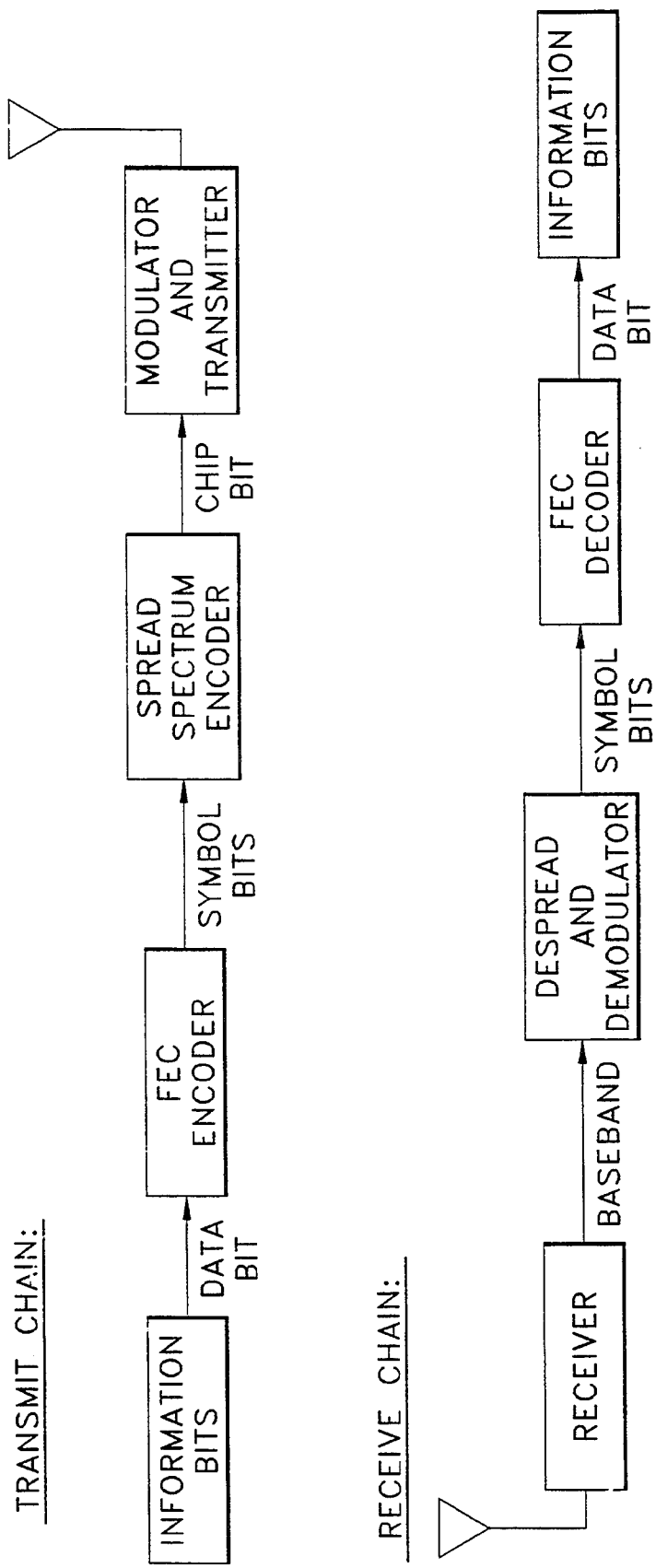
FIG. 2 is a block diagram of the direct sequence spread spectrum approach.

FIG. 2 shows a block diagram of the direct sequence spread spectrum approach. A forward error-correcting encoder generates two symbol bits for each data bit. The extra symbol bit is used in the receiver's forward error-correction decoder to correct errors occurring at the symbol bit level. Convolutional encoding and Viterbi decoding algorithms are used. The conversion of symbol bit error rates to data bit error rates is well established and is equivalent whether or not spread spectrum is employed.

Figure 3:
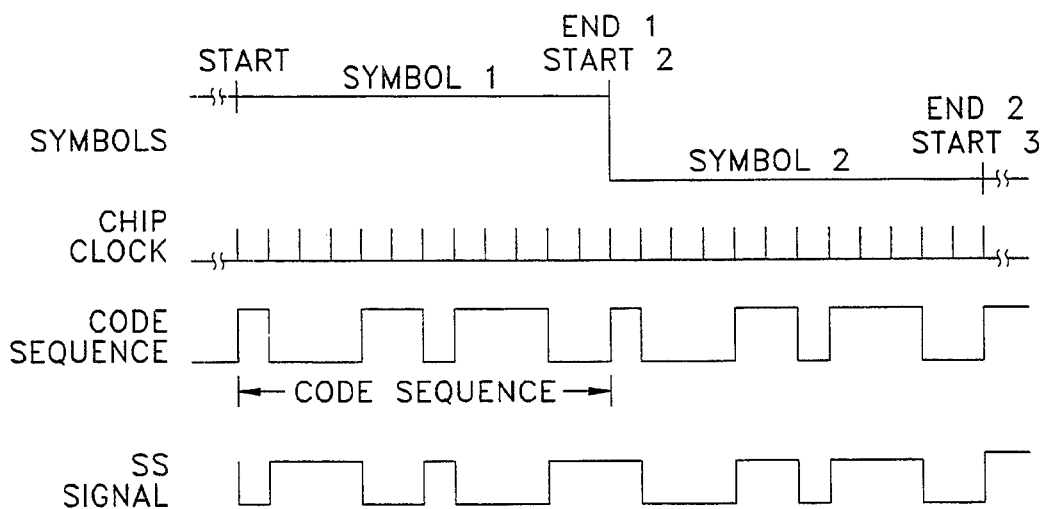
FIG. 3 shows a direct sequence spread spectrum encoded signal structure.

FIG. 3 shows the direct sequence spread spectrum encoded signal structure. The direct sequence code may be considered a fixed length, pseudo random series of 0s and 1s. The bit rate and timing of the direct sequence code are selected such that the beginning of the first bit of the code aligns with the beginning of a symbol and the end of the last bit of the code aligns with the end of the symbol. The output of the encoder is the exclusive OR function between the symbol bit and the code bit sequence. The net effect is to generate a transmitted signal with a bit rate many times higher than the symbol rate. The transmit bit rate is called the chip bit rate and is given by the following equation:

$$\text{Chip bit rate} = \text{symbol bit rate} \times \text{code length.} \quad \text{Equation 1}$$

Since an entire code sequence is used for each symbol, the code length and chips per symbol are equivalent. Processing gain is defined as the spread spectrum encoded signal bandwidth divided by the bandwidth resulting from the direct modulation of the symbol bits. For direct sequence spread spectrum systems, processing gain is equal to the code length.

The receiver performs a de-spreading function which removes the code sequence from the symbol bit and thereby regenerates the original symbol bit. The de-spreading function is accomplished by performing a cross-correlation between the incoming signal and the known spread spectrum code sequence. This is performed at the correct code phase.

The net effect of spread spectrum encoding is to produce a transmitted signal that has a RF bandwidth wider than that produced by direct modulation at the symbol bit rate. Evaluated as an isolated system, end-to-end performance i.e. transmit symbol bit to receive symbol bit, is not altered by the use of spread spectrum. The amount of received signal power required to receive symbol bits at a given symbol bit rate and error rate is not impacted by the use of spread spectrum. The signal power required is calculated using the following equation:

$$\text{Symbol error rate} = f(Eb/No) \quad \text{Equation 2}$$

Eb is the energy per symbol bit within the receiver. No is the noise spectral density within the receiver at the same point the energy per symbol bit is referenced (usually at the antenna connection). "f" is a function which for ideal processing depends on the modulation method used i.e. Binary Phase Shift Keying (BPSK), Frequency Shift Keying (FSK). The error rate versus Eb/No for the modulation schemes is available. For example, for BPSK modulation at an Eb/No equal to 11.3 dB, the symbol error rate is $10^{-7}$. Spread spectrum technology does not alter this relationship and processing gain can not be used to trade off bandwidth for received signal power.

The susceptibility of this system to interference generated by other systems depends primarily on the type of signal generated by other systems. The FCC and international organizations set limits on the maximum power spectral density allowed in satellite communication systems. This avoids narrow band type of interference.

Satellite communication systems using high power are required to be of wide bandwidth to alleviate potential interference. For example, an Eb/No 11.3 dB is sufficient to overcome simultaneous reception of multiple signals at the maximum level allowed by the FCC. The effect of the interference is to increase the apparent noise level, i.e. "No" term which results in an increase in bit error rate. The impact of the interference is essentially the same whether or not a spread spectrum method is used since spread spectrum processing does not significantly alter the spectrum of wide band signals.

The interference imposed by this system on other systems is governed primarily by the peak power spectral density of signals transmitted by this system. The ideal peak power density is given by the following equation:

*Peak power spectral density=2×power/bit rate*    Equation 3

In equation 3, the bit rate is equivalent to the chip bit rate of equation 1 when spread spectrum encoded signals are employed. As an example, at a bit rate of 1,000 bps, the transmit power level required to produce an Eb/No of 11.3 dB at the receiver with a moderate gain antenna, results in a power spectral density which exceeds the FCC limits. Such a signal would likely interfere with the performance of other systems. Using spread spectrum technology, the bit rate may be increased independent of the symbol rate. The code length is selected to reduce the peak power spectral density to a level below the limit imposed by the FCC.

An additional code length selection criteria is imposed on the reverse link, wherein code multiplexing is used. Fifty coded signals are received at the hub terminal simultaneously. Since the cross-correlation between one code and the other 49 are not zero, the other 49 coded signals increase the apparent noise level when de-spreading an individual coded signal. The apparent noise introduced by he simultaneous code multiplexed signals is given by the following equation:

*Apparent code multiplex noise=number of signals×normalized cross-correlation*    Equation 4

In equation 4, the normalized cross-correlation is the cross-correlation between orthogonal codes divided by the cross-correlation of an individual code with itself, termed auto-correlation. For a given code generation algorithm, longer code sequences have lower normalized cross-correlations. The apparent code multiplex noise is essentially additive to the No term in equation 2. The code length is selected as a tradeoff between the increase in overall system noise, the complexity associated with longer codes and the increase in bandwidth associated with longer codes.

A summary of the selection process for the signal power and spread spectrum code lengths is as follows:

(a) Symbol rate is selected based on the communication needs.

(b) Eb/No is selected using equation 2 based on the required error rate.

(c) Transmit power is computed using the link equation provided in literature. Lower antenna gains require higher transmit power to produce the same Eb.

(d) The peak power spectral density is reduced to below the FCC limit by selection of the spread spectrum code length; equation 2 and 3 are used in combination for this step.

(e) For the reverse link employing code multiplexing, the code length is evaluated in terms of allowable increase in apparent noise as determined by equation 4.

For satellite communication systems with remote terminals employing moderate antenna gains, i.e. in excess of 20 dBi and code multiplexing of over 40 simultaneous signals, the code length is typically governed by criteria (e) rather than (d). Self-interference is the dominate design criteria rather than interference to or from other systems.

Mobile Remote Terminals

A mobile remote terminal includes operation of a terminal from any ground transportation system while in motion. The mobile remote terminals incorporate an antenna providing a 3° beamwidth in azimuth and 60° beamwidth in elevation. The antenna position is controlled in azimuth relative to the ground vehicle and is aligned with the direction to the satellite. When used in conjunction with the redundant satellite invention, the mobile remote terminal tracks and acquires satellite 11 and signal 19. Should satellite 11 fail, the antenna azimuth is aligned with the direction of satellite 12 and signal processing is equivalent to the fixed-site remote terminals. The azimuth angle tracking is based on a sequential lobing method. The antenna azimuth is dithered and the position which results in the strongest signal received is considered direction to the satellite.

A GPS receiver in the mobile remote terminal enables rapid acquisition of the spread spectrum encoded signal. The GPS signals are strong enough to allow their receipt with an antenna gain at 6 dBi which provides a sufficiently broad beam pattern to eliminate the need for antenna direction searching. The GPS receiver only needs to search in frequency and code phase. For recent GPS receiver designs, signal acquisition requires less than 10 seconds.

Figure 4:
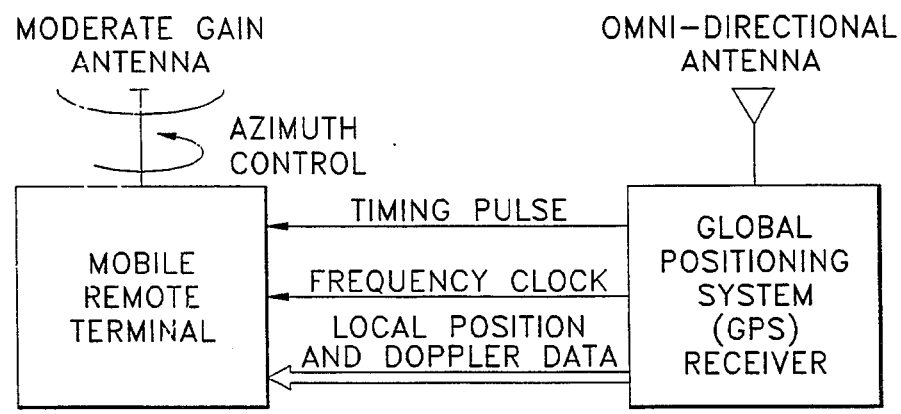
FIG. 4 shows an interface between a GPS receiver and the remainder of the mobile remote terminal.

FIG. 4 shows the interface between the GPS receiver and the remainder of the mobile remote terminal. The GPS receiver outputs the local time at an accuracy of better than 1 microsecond and the current position of the mobile remote terminal. The GPS receiver also tracks the GPS signal in frequency. The frequency reference is used to provide the initial frequency setting for acquisition of the signal from the satellite communication system. The time and local position are used to set the initial code phase setting for the acquisition process. The search is then performed in antenna azimuth angle with short excursions in frequency and code phase. Because the initial frequency settings and code phase settings are accurate, this acquisition of the data communication signal can be expected to occur within several seconds. Communication link considerations such as signal power, code length and bandwidth are equivalent to the fixed-site in remote terminals.

Forward Link

Figure 5:
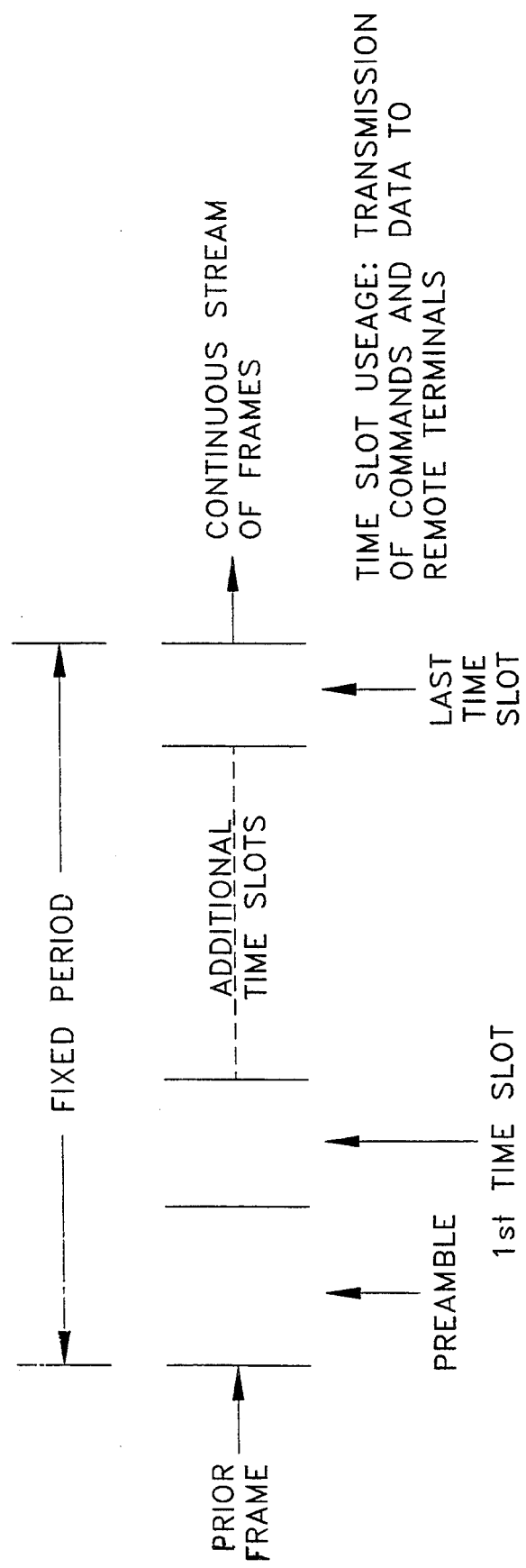
FIG. 5 is a frame structure used on the forward link, namely a hub terminal to remote terminals communication link.

FIG. 5 shows the frame structure on the forward link i.e. hub terminal to remote terminals. The structure of an individual bit is shown in FIG. 3. The hub terminal transmits 1,000 symbol bits per second which corresponds to one frame per second. The preamble within the frame provides frame synchronization. On occasion, data are contained within the frame that provides the time of the start of the frame and the delay to an individual fixed-site. The delay is computed at the hub terminal based on the position of the hub terminal, satellite and the remote terminal. The remote terminal at the fixed-site can then determine the time to within one second resolution. The bit synchronization function subdivides the one second frame into 1,000 bit slices. Thereby, time resolution is available at one millisecond. The bits are subdivided by the spread spectrum encoded structure shown in FIG. 3. The code phase tracking function provides the fine grain accuracy at one microsecond resolution.

Reverse Link

A combined TDMA and code multiplex architecture is used in the reverse link i.e. from the numerous remote terminals to the hub terminal. Fifty remote terminals transmit at the same frequency, same time, but using a different spread spectrum code which are orthogonal to one another. The remote terminals transmissions are synchronized in accordance with the frame structure shown in FIG. 5. The hub terminal transmits data selecting the 50 remote terminals to transmit during any given frame. The selection is different for each frame. In this manner transmissions from all remote terminals may be requested by the hub terminal.

The hub terminal needs to acquire each of the 50 simultaneous signals in both code phase and frequency. Since each of the remote terminals has a different path length to the hub terminal, the code phase for each remote terminal is different. The frequency of each signal is different, due to the Doppler shift associated with the mobile remote terminals and equipment inaccuracies for all remote terminals.

Figure 6:
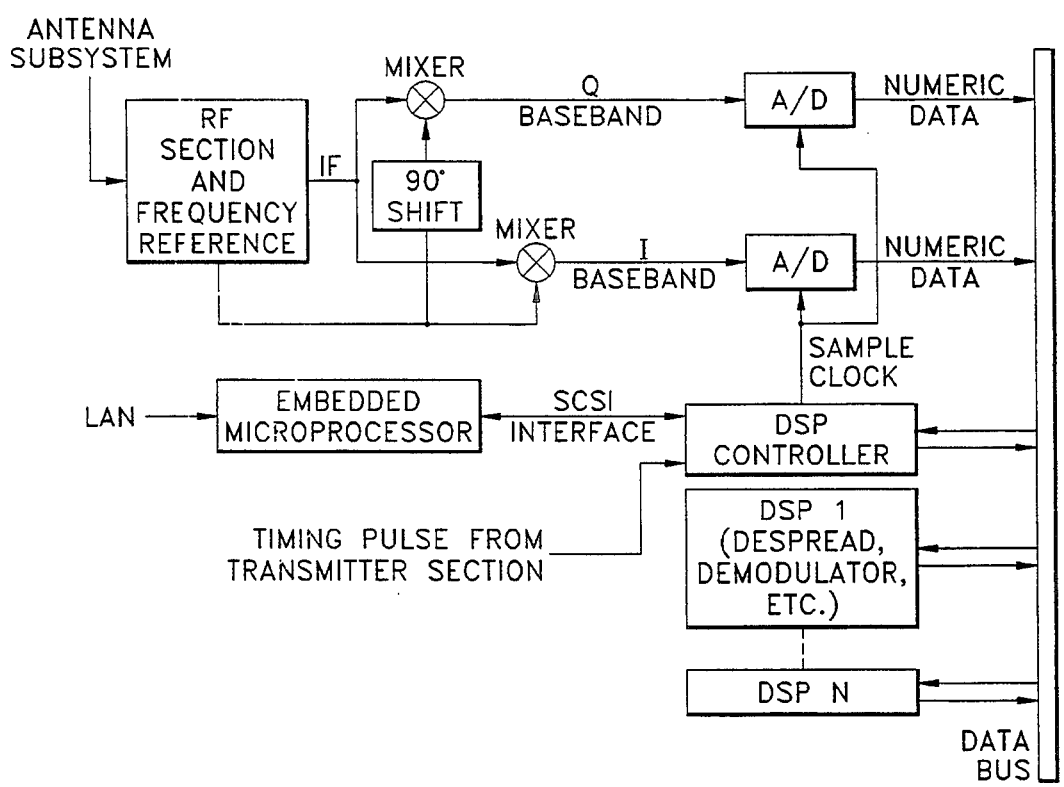
FIG. 6 is a block diagram of a hub terminal receiver system.

FIG. 6 shows a block diagram of the hub terminal receiver system. The in phase signal, termed I and the quadrature phase signal termed Q are given by the following equation:

$$\text{Equation 5:} \quad I = \text{signal amplitude} \times \text{cosine (theta)}$$
$$Q = \text{signal amplitude} \times \text{sine (theta)}$$

In equation 5, theta is the phase of the received signal relative to the arbitrary phase of the local reference. The I and Q values provide a numerical database of the composite received signal consisting of the 50 simultaneous signals plus noise. The sampling rate for the I and Q value must provide at least one sample per spread spectrum chip bit and must be at least twice the maximum of frequency error of the incoming signal. The sampling period is slightly longer, i.e. 50 milliseconds, than the frame time to allow for the different path lengths to each remote terminal.

The data set is transferred to 50 Digital Signal Processors (DSP) each dedicated to the acquisition, despread and demodulation of the signal from an individual remote terminal. Each DSP performs a cross-correlation between the data set and the spread spectrum code corresponding to the remote terminal. The cross-correlation is scanned in code phase and the peak cross-correlation value is used as the correct code phase. The frequency of the incoming signal represented by the I and Q database is altered by each DSP through complex multiplication of the data using a phase angle changing at a constant rate. The proper frequency offset, i, e. phase rate of change, is established by two criteria. First, the cross-correlation is maximized. Second, the known unique word is correctly demodulated. The unique word also resolves the phase ambiguity associated with phase shift keying modulation. This architecture and processing methodology eliminates the need to transmit a "leader" signal to achieve frequency and code phase lock-on prior to the transfer of useful information.

Demodulation

Code multiplexed signals of widely varying amplitude can be received in the reverse link. The frame structure and receiver approach are as shown in FIGS. 5 and 6 respectively. The I and Q database is generated and utilized as described earlier.

Figure 7:
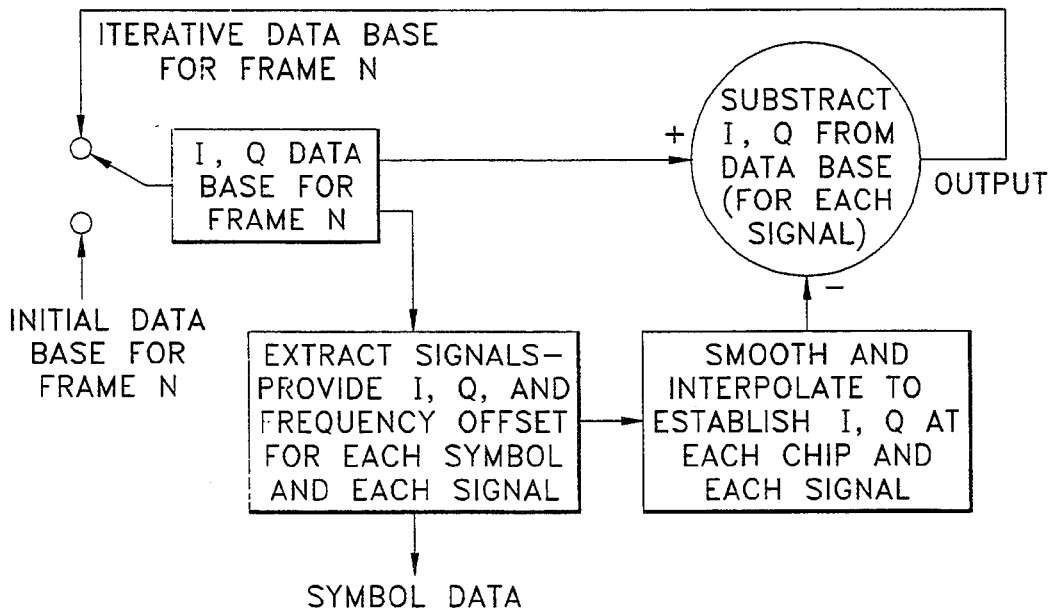
FIG. 7 is a block diagram illustrating code multiplexing processing used to achieve de-spread and demodulation of simultaneous signals exhibiting wide variations in amplitude.

FIG. 7 shows the additional processing used to achieve de-spread and demodulation of simultaneous signals exhibiting wide variations in amplitude. For the first processing pass on the fixed database, the stronger signals increase the apparent noise to a level that makes it statistically unlikely that the processing will result in the determination of the proper code phase and frequency of the weaker signals. The I and Q value of each signal successfully de-spread is calculated at each sample time using an interpolation and smoothing algorithm. The I and Q values for each of the signals is subtracted from the fixed database. The apparent noise associated with these signals is, thereby, removed from the database. Reprocessing of the database is performed and the likelihood of successful extraction of the weaker signals is significantly improved. This process is repeated until extraction of all signals is accomplished.

Polling

Highly dynamic polling sequences while maintaining low data rate transmissions by the hub terminal are possible. The hub terminal can issue commands addressed to an individual remote terminal or globally to all remote terminals. The hub terminal also has the capability to issue commands addressed to a particular block number. The network allows 4096 block numbers.

Commands issued by the hub terminal assign an individual remote terminal to be a member of a block number. A remote terminal may be a member of numerous blocks. A block number may contain any number of remote terminals. Numerous groupings of remote terminals may thereby be established to encompass all desirable polling sequences. The efficiency of this approach is made evident by the configuration of the preferred embodiment.

The SCADA network may consist of up to 10,000 remote terminals with 50 remote terminals responding to polling requests every second. Two hundred blocks are established with 50 remote terminals in each. One command per second from the hub terminal designates which block, and therefore, which 50 remote terminals are to transmit during the next second. Many more than 200 blocks may be established with different groupings with 50 remote terminals thereby allowing a wide range of polling sequences. To further enhance flexibility, blocks may be added and subtracted from other blocks. For example, by issuance of three commands, the hub terminal may request polled responses from those remote terminals contained in block number one, plus those in block number two, excluding those in block number three. Individual remote terminals may also be added and deleted from the response set.

Emergency Notification

The network architecture allows the remote terminals to notify the hub terminal of the occurrence of a preestablished event at the remote terminal site independent of the polling sequence being implemented by the hub terminal. Each remote terminal is assigned one of approximately 1,000 orthogonal spread spectrum codes and one of ten time slots. Ten thousand orthogonal emergency event signals are established. The transmission of an emergency event signal by one remote terminal will not interfere and potentially negate the emergency notification transmission from another remote terminal.

If more than 10,000 remote terminals are needed, additional orthogonal multiplexing is implemented by the use of inherent range differences between remote terminals. Several remote terminals may be assigned the same time slot and code number provided they are each at a different range such that the spread spectrum code phase results in a signal that is orthogonal to the others. A different unique word is assigned to each of these remote terminals to ensure identification of the unit issuing the emergency notification.

Since the emergency notification signals are code multiplexed, each may be received with little or no interference with one another and the normal data transmissions. In the event that numerous emergency notifications, e.g. 25 or more, are transmitted simultaneously, there will be sufficient increase in the apparent noise level associated with spread spectrum technique such that transmissions may not be properly received. This effect is described by equation 4. This limitation is overcome in a deterministic manner by the system architecture.

The remote terminals continually transmit the emergency notification until the notification is acknowledged by the hub terminal on the forward link. The retransmission of the emergency notification is performed on a periodic basis whereby a programmable number of frames is skipped between transmissions. The hub terminal has the ability to enable or disable emergency notifications of each remote terminal using the block addressing approach used for polling. Also, the hub terminal can synchronize the periodic transmission to a particular frame. Normally, the hub terminal enables all remote terminals to transmit emergency notifications. The hub terminal continuously monitors the apparent noise level of the code multiplexed signals and whenever a threshold is exceeded, the hub terminal globally disables the remote terminals and sequentially enables selected blocks of remote terminals. The hub terminal also synchronizes the periodic transmission of multiple blocks to affect time multiplexing of the emergency notifications. In this manner, all emergency notifications will be received no matter how many occur simultaneously.

Installation

Figure 8:
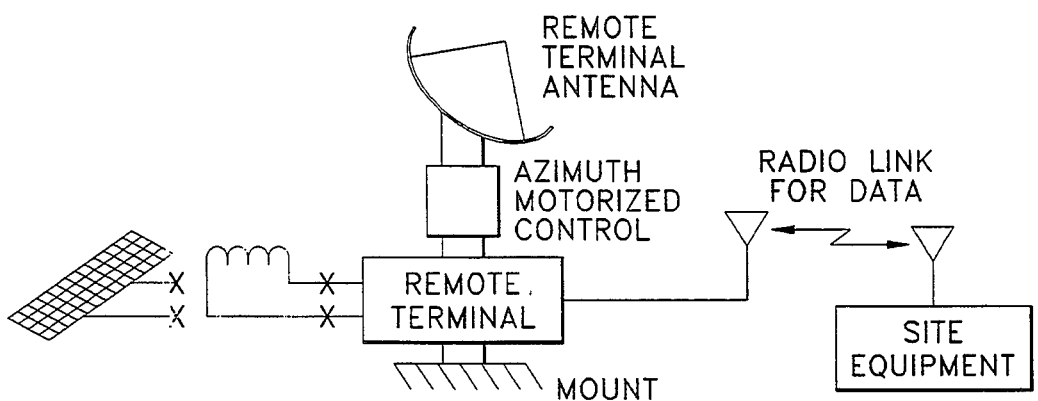
FIG. 8 is a diagrammatic view illustrating an installation of a remote terminal.

FIG. 8 shows a block diagram of the rapid installation remote terminal. The fundamental concept is to allow installation without the need for physical connection to any other equipment. The remote terminal is secured to any suitable stable structure with clear visibility in the direction to the satellite. In many applications, the remote terminal will be located nearby high power electrical transmission lines. In this case, power is derived from the transmission lines using induction coupling. In other cases, the remote terminal incorporates solar array for primary power. In either case, a storage battery is incorporated to permit ongoing operation when primary power is not available.

The data interface between the site equipment and remote terminal is achieved by a radio link. For the preferred embodiment, this is a low power 900 MHz subsystem. Asynchronous serial protocol is used. Antenna alignment is achieved using the built-in antenna drive equivalent to the equipment used in the mobile remote terminals. To shorten the acquisition time, an initial bearing to the satellite is provided to the remote terminal by means of a data link. For cost and complexity reasons, many remote terminals incorporate fixed antennas. For these remote terminals, rapid installation is achieved by means of automated installation equipment.

Figure 9:
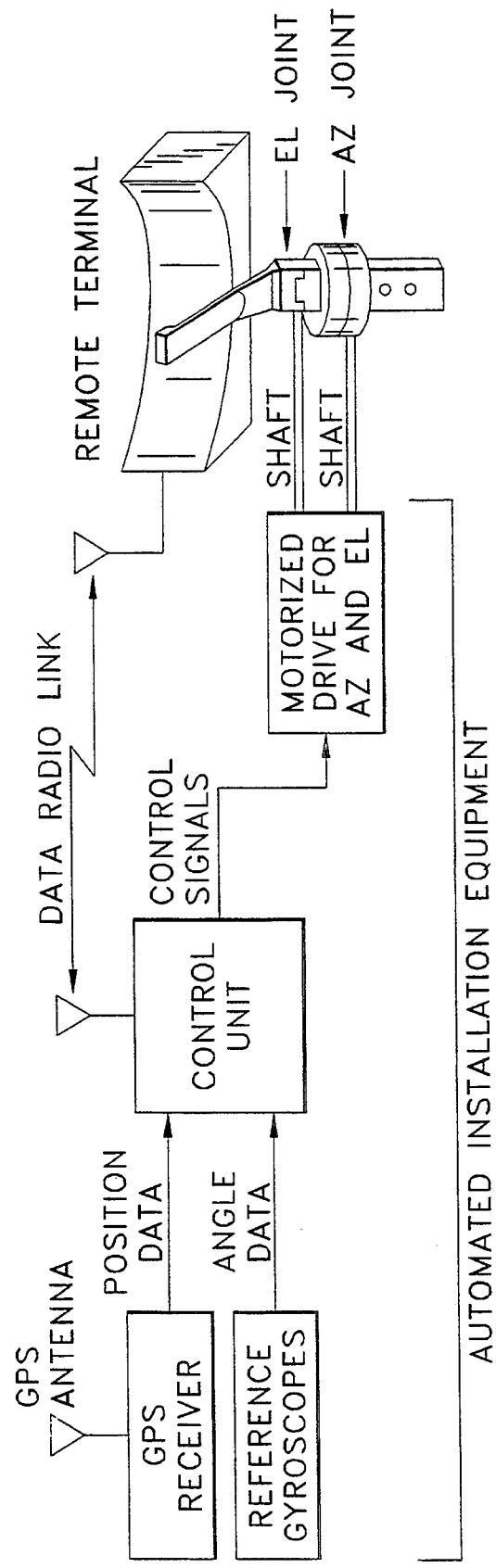
FIG. 9 is a block diagram illustrating automated installation equipment at a remote terminal.

FIG. 9 shows the block diagram of the automated installation equipment and its connection to the remote terminal. The automated installation equipment is temporarily attached to the remote terminal to achieve antenna alignment and is removed after alignment is completed. A GPS receiver is used for both position and attitude determination. Three GPS antennas are used in conjunction with the GPS receiver in a differential mode to establish the orientation of the installation equipment. Use of a GPS receiver, in combination with reference gyroscopes is also possible. Motors and drive mechanism rotate the remote terminal to point its antenna at the satellite. The received signal strength of the remote terminal is monitored to accomplish fine adjustment of the antenna alignment. After alignment is achieved, the rotary joint of the remote terminal is locked and the alignment equipment is removed.

Retrieval of Information

Retrieval of rapid measurements collected before, during and after a transient event without impacting the SCADA network throughput requirements is achieved. The measurements required for detailed analysis of the transient event are collected and stored continuously in read/write memory contained within the remote terminal.

The memory is configured as a fixed size stack. As new data is pushed on top of the stack, old data, exceeding the size of the stack, is lost. The activation of a trigger causes the storage process to stop. The data within the stack is then available to be retrieved over the satellite communication network using the standard polling method and data rates. The activation of the trigger is based on the past and present value of one or more sensed signals as compared to threshold values. In this manner, trigger activation occurs simultaneously with the transient event.

An adjustable time delay, between trigger activation and stoppage of data storage, controls the allocation of the amount of data stored before versus after the transient event. For example, if the stack size allows storage of two seconds of data and the time delay is set at one second, the stack will contain one second of data collected before the transient event and one second of data collected after the transient event. All parameters associated with the collection, storage and retrieval of data for transient analyses are programmable over the satellite communication network.

Communication Network

The communication network uses satellite transponders. The architecture is based on a combined Time Division Multiple Access/Code Multiplex (TDMA/CM) methodology. All signals are direct sequence spread spectrum encoded to reduce the power spectral density to a level compliant with FCC regulations. A dynamic polling approach is used to control the sequence of transmissions from the remote terminals. In addition to two-way communication, the network provides time distribution from the hub terminal to the remote terminal.

Hub Terminal

Figure 10:
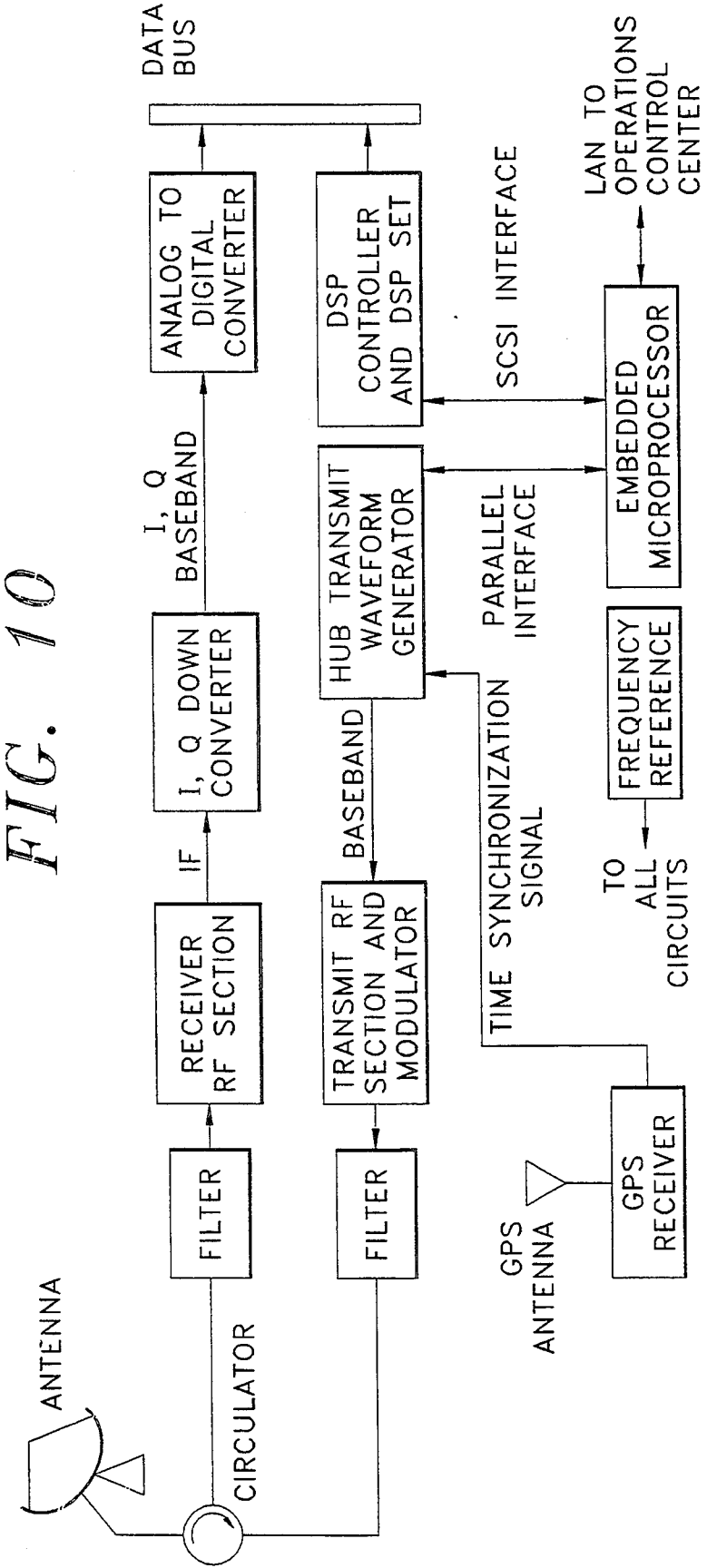
FIG. 10 is a block diagram of a hub terminal.
Figure 11:
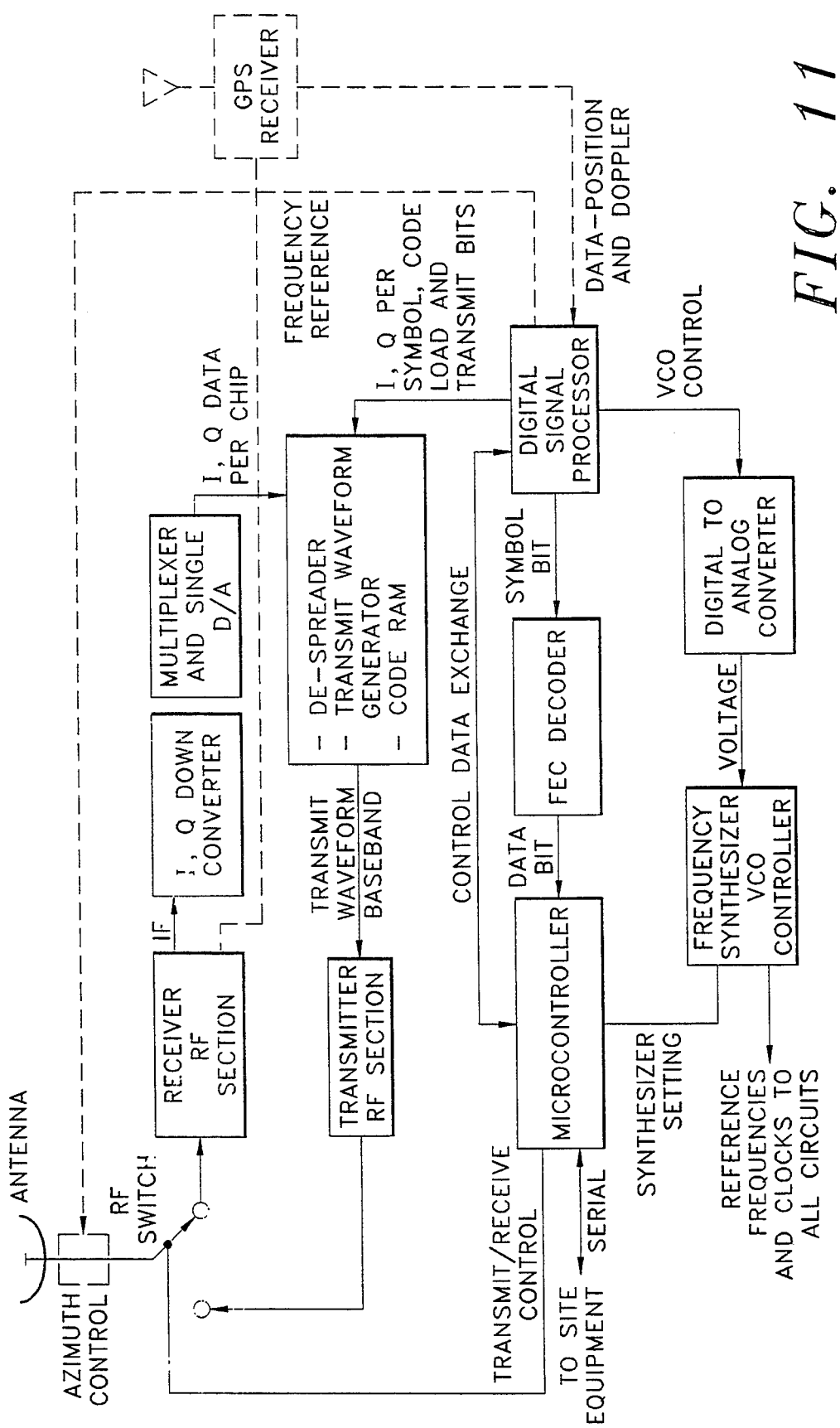
FIG. 11 is a functional block diagram of the remote terminal.

As illustrated in FIG. 10, the hub terminal includes an embedded microprocessor which interfaces with the hub terminal hardware to perform both the transmit and receive functions. The embedded microprocessor also interfaces with the operations control center by means of a Local Area Network (LAN). The operations control center generates commands to be issued over the satellite communications network to equipment at a single or group of remote sites. In addition, the operations control center issues request for data from selected remote sites. The embedded microprocessor implements the functions requested by the operations control center.

The embedded microprocessor interfaces to the hub waveform generator by means of a computer parallel port. The hub transmit waveform generator consists of the transmit frame timing circuit and three Random Access Memory (RAM) circuits. The frame timing circuit is synchronized to a precision time pulse issued by the GPS receiver. One of the RAMs stores the spread spectrum code sequence. Whenever the spread spectrum code sequence is to be changed, the embedded microprocessor downloads the new code sequence into this RAM. The embedded microprocessor does not store the codes, but rather generates the code sequence from a preestablished algorithm when required. The other two RAMs provide double buffering of the symbol bits per frame. While one symbol RAM is being used to generate the transmit frame waveform, the other symbol RAM is available for loading from the embedded processor. The functions of the symbol RAMs are altered on each frame.

The output of the hub waveform generator circuit feeds into a BPSK modulator. Modulation is performed at an intermediate frequency. The modulated intermediate frequency is sent to commercially available equipment for generation of the final transmit signal corresponding to the satellite frequency band being used. Precision local frequency references are used in all cases and result in a frequency and time accuracy better than one part per billion.

The signals transmitted by the hub terminal are translated by the satellite and received by all remote terminals. In order to maximize the efficiency of the data transmitted on the forward link, the present invention incorporates a flexible addressing scheme. Remote terminals may be addressed individually, globally i.e. all remote terminals or in dynamically allocable groups, termed blocks. Unique addressing is accomplished using an identification number unique to each remote terminal. Using commands transmitted over the communications network, remote terminals are assigned to be members of blocks. Any remote terminal may be assigned as a member of any block. A block may contain any number of remote terminals. In order to limit the processing at the remote terminals, an individual remote terminal is limited to be a member of up to 256 blocks. In terms of issuing control commands, this structure allows a single command to be issued to a predefined group of remote terminals. It is also used to select the group of remote terminals to transmit on the reverse link during the next frame.

The frame structure of the signal transmitted by the hub terminal is shown in FIG. 5. The beginning of each frame is designated by a unique pattern of symbols termed the preamble. The preamble is followed by multiple commands. Each command contains a new remote terminal address. Numerous command types are implemented. One type causes the transfer of control data to the local site equipment connected to the remote terminal. Another type requests the remote terminal to transmit performance monitoring data on the next frame. A third type encompasses housekeeping which is used for block assignments, spread spectrum code assignments and other ancillary functions such as testing.

The forward link includes the Forward Error-Correction (FEC) capability at ½ rate, i.e. two symbol bits for each data bit. This FEC function lowers the data error rate during marginal link conditions. The data rate is reduced by a factor of two for the same system bandwidth as compared to not using FEC. The communication system architecture allows the FEC to be turned on and off for each frame. One of two different preambles is affixed to the frame by the hub terminal to allow the remote terminals to distinguish whether or not FEC is used on that frame. With FEC on, the number of commands per frame is half the number with FEC off. The decision to use FEC is based on the weather conditions reported by the national weather service for the locations covered by the communications network and the actual error rate realized during ongoing communications. The convolutional encoding for the FEC function and the preamble generation are performed by the embedded microprocessor.

For communication networks consisting of several thousand or more remote terminals, the hub terminal may request a data transmission from a particular remote terminal every two to three minutes. An emergency event may occur at the remote site requiring prompt reaction. When such an emergency event occurs at a particular remote site, the remote terminal transmits a spread spectrum encoded signal, which is code multiplexed, with the standard polled signals. These signals are also synchronized to the frame to enable the code multiplexed processing.

The hub terminal receives signals from multiple remote terminals. The signals are at the same frequency and occur simultaneously, but are encoded with different orthogonal direct sequence spread spectrum codes using BPSK modulation. The remote terminal signals have a frame structure similar to that used on the forward link. Each return link frame starts with a preamble and is followed by a fixed length string of data. The data is always FEC encoded at ½ rate. Guard times are added to the beginning of each frame to prevent overlap of signals generated on consecutive frames caused by differences in range to the remote terminals. The return link frame is synchronized to the forward link frame. Using this architecture, the hub terminal has prior knowledge of which remote terminal signals exist, the time the signals will be received at the hub and the spread spectrum code that was used.

The RF receiver section of the hub terminal downconverts the received composite signal to baseband and generates I and Q signals as defined in equation 5. These two signals are sampled and converted to numeric values by analog converters. The I and Q data are sent over a databus to multiple demodulator subsystems; one demodulator for each remote terminal signal. The demodulators have a double buffered RAM to allow processing to overlap the frame boundary. The data set in the RAM is synchronized to the start of the received frame, i.e. the addresses in the data RAM multiplied by a scale factor correspond to the time after the start of the received frame.

The embedded microprocessor transfers control data to each of the demodulators on a separate databus. The control data includes the spread spectrum code number, preamble number, type of remote terminal, i.e. mobile or fixed, expected code phase, i.e. RAM address for zero phase and expected frequency offset. The latter data items are derived from previous demodulations. These data shorten the acquisition process for signals from fixed-site remote terminals.

Each demodulator subsystem contains a high speed Digital Signal Processor (DSP). The DSP generates the spread spectrum code from the code number provided by the embedded processor. The first step in the demodulation process is to establish the spread spectrum code phase of the received signal. The DSP performs a cross-correlation of the spread spectrum code with the I/Q database starting at the code phase provided by the embedded processor. The I/Q database is at the chip level for the spread spectrum code. The cross-correlation process produces a single I/Q pair at the symbol level. The magnitude of the cross-correlation is given by the sum of the squares of the I and Q terms at the symbol level. A spiral-out scan pattern in code phase is used until the magnitude of the cross-correlation exceeds a threshold. That code phase is used for the subsequent demodulation processes. Should these processes fail to produce reliable data, the code phase scan is resumed and he process is repeated.

If no code phase results in reliable data, the offset frequency is scanned using a spiral-out pattern. To minimize the search processing, the maximum possible frequency step size is used. The maximum step size is governed by the Nyquist Sampling Theorem which dictates a frequency step of ½ the symbol rate. For example at a symbol rate of 1,000 bps the maximum step size needs to be less than 500 Hz. The frequency offset is achieved by the DSP though complex multiplication of the I/Q database by a unit vector of constantly increasing phase. At each new frequency setting, the code phase search is performed.

The symbol demodulation processing commences when the magnitude of the cross-correlation exceeds the threshold. Symbol demodulation is the process of converting the I and Q values at the symbol level into 1s and 0s for the symbol bits. The DSP computes the phase represented by the I/Q pair for the stream of received symbols. The phase computed contains a random component due to system thermal noise, interference and phase noise. A Kalman filter type algorithm decides whether the symbols are 1s or 0s depending on which set produces the minimum mean square error. This approach is tolerant of frequency errors provided the errors are below the maximum allowed by the Nyquist Sampling Theorem. The advantage of this methodology is that no coherent carrier recovery circuitry is needed. Also, the demodulation process allows the receiver frequency to be offset from the signal carrier frequency.

When sufficient symbols have been demodulated, the DSP performs a cross-correlation between the received sequence of symbol bits and the known-preamble sequence. The preamble cross-correlation involves a search at the symbol level analogous to the code phase described earlier. The preamble cross-correlation process provides two functions. First, it achieves frame synchronization whereby the time of each symbol bit is determined relative to the beginning of the frame. Second, it resolves the 180° phase ambiguity associated with BPSK modulation. The demodulation algorithm may result in symbol bits which are all arbitrarily inverted. The cross-correlation with the preamble determines the polarity of the symbol bitstream.

Next, the symbol bit stream undergoes FEC decoding. A Viterbi algorithm is used. If the confidence level of the data exceeds a threshold, the entire demodulation process is designated as successful. The information bits, the I/Q values at the symbol level, the code phase, frequency offset and other pertinent information are transferred to the embedded processor. If any step in the demodulation process fails, successive elimination processing is initiated.

The embedded processor informs selected demodulator subsystems to perform successive elimination. Those demodulators retain the previous I/Q database at the chip level. The embedded processor downloads the I/Q data at the symbol level for all the successfully demodulated spread spectrum signals as well as the code number and code phase for each signal. For each signal, the DSP within the demodulator smoothes the I/Q data at the symbol level, generates the spread spectrum code sequence from the code number and respreads the data to the chip level. The result is an I/Q database for each signal with sample times coincident with the samples contained in the original database. Each I/Q representing a successfully demodulated signal is subtracted from the original database using complex arithmetic. The interference effects of those signals has thereby been removed from the database. The entire demodulation process is now repeated With the expectation of successful demodulation of the weaker signals. The process of successive elimination may be repeated several times until all anticipated signals are demodulated.

Reception and demodulation of emergency notification signals are performed in the same manner as normal data frames. Since there is no apriori knowledge at the hub terminal of which remote terminals are transmitting an emergency notification, all spread spectrum codes assigned to the emergency notification function and all time slots need to be searched for a possible signal. The processing load is alleviated since the emergency notifications are transmitted for only one time slot and not for the entire frame. Multiple demodulator circuits are assigned to the emergency notification function, each assigned a specific set of spread spectrum codes.

Remote Terminal

The remote terminals receive a continuous stream of frames from the hub terminal via the satellite. The spread spectrum code for signal 19 of FIG. 1 is normally used for de-spread processing. Should the preamble not be detected, the remote terminal switches to the spread spectrum code for signal 20 of FIG. 1. Should neither preamble be detected, the remote terminal periodically alternates between the two spread spectrum codes. The same signal is received, de-spread, demodulated and interpreted by all remote terminals. Each remote terminal deciphers the command address to determine whether it applies to that remote terminal. If the address is a block number, the remote terminal scans its memory to determine whether the remote terminal has been assigned to be a member of that block number and if it has, the block address is considered valid for that remote terminal.

The RF section of the remote terminal receiver downconverts the signal to baseband and generates an I and Q signal in a manner similar to the hub terminal. These two signals are sampled and converted to numeric values by an analog to digital converter. A hardware de-spreader circuit performs a separate cross-correlation between the spread spectrum code sequence and the I and Q values. The DSP generates the spread spectrum code and downloads it to the code RAM in the hardware circuit. The hardware uses a multiplexed architecture and therefore, one analog to digital converter and cross-correlator correlator are required to perform all of its functions. Two pairs of cross-correlations are generated, each pair consisting of an I and Q value at the symbol level. One pair is called "on-time" and consists of the sample timing that produces the maximum cross-correlation. The second pair is selected by the DSP to be an "early" or "late" sample which provides the cross-correlations either one sample earlier or later respectively than the on-time cross-correlations. The DSP periodically alternates between collecting the "early" and "late" sample. The cross-correlations are performed on one entire spread spectrum code sequence which comprises one symbol bit. At the completion of the cross-correlation process, the two pairs of data are transferred to the DSP.

Figure 12:
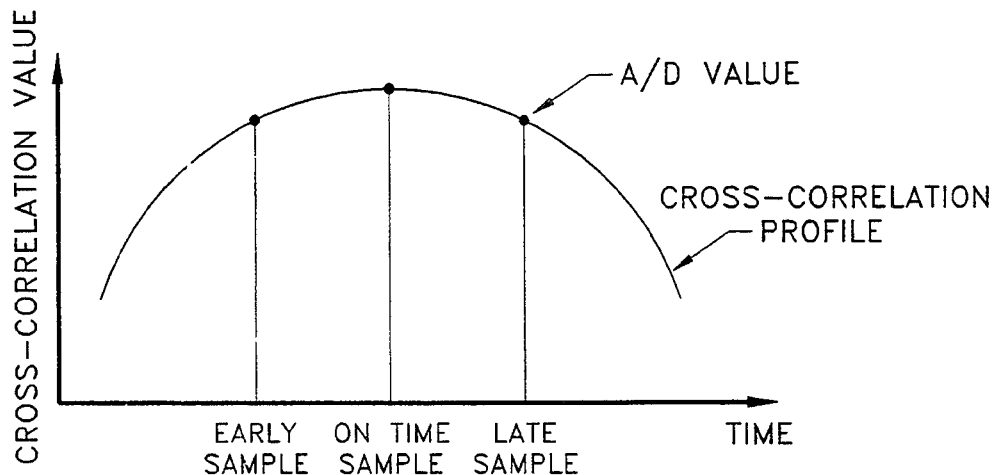
FIG. 12 is a graphical illustration of code phase tracking.

The DSP uses the I and Q data at the symbol level to perform five functions as follows: (1) code phase tracking, (2) frequency tracking, (3) demodulation, (4) frame synchronization and (5) signal acquisition. To track code phase, the DSP computes the magnitude of each pair of data i.e. sum of the squares of the I and Q values. The ratios of the early and late samples are calculated relative to the on-time sample. This is shown pictorially in FIG. 12. A smoothing algorithm is applied to these ratios. The DSP adjusts the sample timing to maintain equality of the two ratios. The "on-time" data are always available at the peak cross-correlation code phase which is equivalent to maximizing the signal to noise ratio. These data are used for subsequent processing. The effects of rapid amplitude fluctuations are removed. The tracking algorithm is based on the ratio of two samples taken at the same time and does not rely on a comparison of signals taken at different times.

Frequency tracking is required due to inaccuracies of the local frequency reference and Doppler shifts for the mobile remote terminals. The DSP controls the frequency by means of a digital to analog converter and a voltage controlled oscillator. Since BPSK modulation results in a suppressed carrier signal, an equivalent square law algorithm is used in the DSP to determine frequency offsets from the I and Q data. A smoothing algorithm is incorporated. The DSP hunts for zero frequency offset by adjusting the numerical value sent to the digital to analog converter.

The DSP also uses the I and Q values to demodulate the signal. Only the on-time I and Q values are used for this process. The processing performed by the DSP is equivalent to that used in the hub terminal. The benefits are retained including the elimination of the carrier recovery circuit and tolerance to frequency variations. The DSP performs a cross-correlation between the received sequence of symbol bits and the two known preamble patterns, one pattern for FEC on and one pattern for FEC off. The preamble cross-correlation process provides frame synchronization and resolution of the 180° phase ambiguity as with the hub terminal, plus the process determines whether FEC encoding was used for the current frame.

Since the hub terminal transmissions are continuous, the remote terminals only need to perform signal acquisition at initial installation and to recover from a loss of signal condition. Acquisition starts with the scan of all possible code phase positions and testing of the magnitude of the cross-correlation relative to a threshold. Reacquisitions starts at the last valid code phase and implements a spiral-out scan pattern. Frequency acquisition is also required due to inaccuracies of the local frequency reference and doppler shift for the remote terminals. To provide the best possible initial frequency setting for the search, the local frequency reference is calibrated at the factory and the corresponding setting is stored in a non-volatile RAM within the microcontroller. The microcontroller contains an algorithm to compensate for frequency changes due to aging. A spiral-out scan pattern is used from after this initial setting. The step size is governed by the Nyquist Sampling Theorem equivalent to the hub terminal. At each frequency setting, the code phase search is performed until the signal is acquired.

Time Distribution

In addition to two-way communication, the network provides high resolution time distribution. The start of each frame transmitted by the hub terminal is synchronized to a timing pulse generated by a precision GPS receiver. Periodically, the hub terminal transmits the Universal Coordinated Time (UTC) of the start of the frame as a command within that frame. Global addressing is used for that command. Also periodically, the time delay for each remote terminal is issued by the hub terminal as commands. Each remote terminal maintains local time by counting the number of frames since the last update and adjusting the time by the delay data. The DSP knows the time of the first symbol in the frame from the frame synchronization function. This provides a local time resolution at approximately the duration of one symbol. Subsymbol resolution is achieved by the code phase tracking function performed by the remote terminal.

The hardware de-spreader circuit contains a slewable counter. For example, for symbol durations of one millisecond, the slewable counter would count from 0 to 9,999 in 0.1 microsecond steps. The counter recycles at the start of each symbol. All I/Q samples and de-spread functions are controlled by this counter. The DSP may command this counter to add or delete a 0.1 microsecond step. The DSP controls the additions or subtractions, i.e. slewing of the counter, based on the code phase tracking algorithm. The hardware de-spreader issues a time synchronization pulse when the slewable counter is at a value of zero and the DSP sets a signal that the first symbol in a frame is being received. This pulse is issued to the site equipment once per frame at a resolution of 1/10,000 of the symbol duration. For the preferred embodiment, the signal delay is not compensated in hardware, but rather the precise time of the occurrence of the pulse is provided as data transferred from the remote terminal to the site equipment. Other embodiments of the present invention, could contain a delay counter to generate the hardware pulse coincident with the one second mark of the UTC.

The microcontroller, within the remote terminal, interfaces with the site equipment. It also deciphers commands received from the hub terminal and stores block addressing information in a non-volatile RAM. Based on the information received from these two sources, the microcontroller decides whether or not to transmit on a given frame and generates the transmit data. Control and information data are transferred from the microcontroller to the DSP to implement transmission. The DSP generates the transmit spread spectrum code and downloads it to the RAM code in the hardware circuit. The DSP transfers one data bit at a time to the hardware circuit synchronized with the symbol transmissions. Upon completion of the transmit frame, the DSP generates and downloads the receive spread spectrum code. The same process is used whether the transmission is a normal data frame or an emergency notification. In the case of emergency notification, the frame structure is equivalent to the hub terminal waveform as shown in FIG. 5. The emergency notification consists of the transmission of a unique word during one of the available time slots. The transmissions are based on the timing generated by the slewable counter and is therefore synchronized with the waveform received from the hub terminal.

Mobile Remote Terminals - Signal Acquisition

The mobile remote terminals are equivalent to the fixed-site remote terminals except for the addition of a steerable antenna and a GPS receiver. The antenna is steered in azimuth by means of a motorized control, or electronically. The azimuth angle is controlled to point the antenna in the direction of the satellite. A sequential lobing tracking method is used for this purpose. The antenna azimuth is dithered about the estimated correct angle. The estimated angle is continuously updated to correspond to the angle producing the peak signal strength. A smoothing algorithm is used to reduce the effects of signal scintillation. In order to acquire the initial estimated angle, the antenna azimuth is scanned. The step size for the scan is determined by the antenna azimuth beamwidth. At each step, the signal acquisition process described for the fixed-site remote terminals is performed. Without an initial code phase and frequency setting, the addition of the antenna search requirement causes the entire signal acquisition process to take too long. The GPS receiver provides the initial code phase and frequency settings to overcome this problem.

An accurate frequency reference is established within the GPS receiver by tracking the carrier of the incoming GPS signal. This frequency reference is used to establish an initial frequency setting. The referenced frequency may be used directly to generate the frequencies necessary for signal downconversion to baseband. Alternatively the GPS referenced frequency is injected into the receiver intermediate frequency amplifier and downconverted to baseband. The front-end RF circuit is turned off during this process. The de-spread circuit is also turned off by downloading the spread spectrum code sequence of all 1s. Under these conditions, the I/Q values transferred to the DSP represents the frequency offset between the GPS reference and the standard receiver reference. The frequency range that can be measured is governed by the Nyquist Sampling Theorem. During this period, the de-spread function is effectively bypassed and the rate of I/Q transfer is maximized. The DSP adjusts the DAC output, and hence the setting of the local reference frequency to obtain to correct frequency offset. This process is performed prior to code phase acquisition and provides a calibrated setting of the local reference frequency.

The GPS receiver sends the local position of the remote terminal to the microcontroller. The microcontroller computes the propagation time from the hub terminal to the present location of the mobile remote terminal. The GPS receiver sends a timing pulse to the DSP. Based on the computed propagation time, the microcontroller sends to the DSP the delay time between the GPS timing pulse and the code phase of the received signal. The time delay can be computed since the hub terminal waveform is synchronized to an equivalent timing pulse. The DSP adjusts the slew counter to coincide with the timing pulse offset by the computed delay time. This provides an accurate initial setting of the code phase for the search process. Since the calculations involve approximations, the code phase search process includes testing of several time bins on either side of the initial value. The initial settings provided by the GPS receiver reduce the typical acquisition time by two orders of magnitude.

The mobile remote terminals operate on the same network as the fixed remote terminals. By means of the data provided by the GPS receiver, the mobile remote terminals report their position to the hub terminal. Also, the mobile remote terminals provide the capability for two-way communication with personnel located in the proximity of the mobile remote terminals.

Installation

The rapid installation units eliminate the need for cabling and manual antenna alignment. These units are simply mounted with a clear view to the satellite and are locally level to ensure proper polarization match with the satellite signal.

FIG. 8 shows a block diagram of the rapid installation remote terminal. Antenna alignment can be performed internally and by automated installation equipment.

The built-in alignment approach uses an antenna steerable in azimuth equivalent to the mobile remote terminals. To shorten the initial acquisition time, an approximate azimuth position for the antenna is downloaded to the non-volatile RAM in the remote terminals prior to installation. Since the remote terminals are fixed in orientation, the reacquisition process does not require a scan in the antenna position.

For remote terminals mounted near electric power distribution lines, power for the remote terminal is derived from an induction coil. Other remote terminals may use a solar array as a primary source of power. In either case, a storage battery is used to provide ongoing operation during the loss of primary power. The induction coil, solar array and storage battery are fixed mounted on the remote terminal and the entire package is installed as a single unit. Remote terminals contain a low RF power, 900 MHz radio link to the site equipment. Data communication is implemented using this radio link.

FIG. 9 shows a block diagram of the installation equipment for fixed antennas. The automatic installation equipment contains a GPS receiver connected to an array of three GPS antennas through an antenna switch matrix. The switch matrix allows the GPS receiver to be connected to any one of the GPS antennas. The GPS antennas are configured to be in the same plane and are on the circumference of a circle of one foot in diameter and are separated by 120° from its neighbors. One of the antennas is used to establish the position of the remote terminal. The line-of-site angles to the satellite are calculated from this position and a priori knowledge of the satellite's longitude. The orientation of the installation equipment is determined by switching the GPS receiver among the three GPS antennas. The difference in carrier phase for the signal received by any two antennas is measured by the GPS receiver. This measurement is performed for signals received from several GPS satellites. The set of differential phases uniquely determines the orientation of the installation equipment.

Alternatively, the GPS receiver is used solely to determine the line-of-site angles to the satellite. Rate gyroscopes are used to determine the orientation. Prior to use, the equipment is held stationary for approximately one minute to perform an internal calibration. During the calibration period, the gyro reference unit uses a gyro compassing approach to establish the azimuth reference, i.e. angle relative to true north. Local level reference is also established during this period. After calibration, the rate gyroscope outputs are integrated to establish the current orientation of the installation equipment.

The installation equipment provides motorized control of the elevation angle and azimuth angle of the mounting bracket. The entire unit is-mounted and the automated antenna alignment process is initiated via a switch. Using the present orientation angles obtained from the differential GPS receiver or gyroscopes, the azimuth and elevation angles are automatically adjusted to point the remote terminal at the satellite. The installation equipment contains the 900 MHz radio link to establish two-way communication with the remote terminal. Fine adjustments are made to the angles based on maximizing the strength of the signal received from the satellite. On completion of the alignment, the installation equipment is removed.

Data Storage and Retrieval

Figure 13:
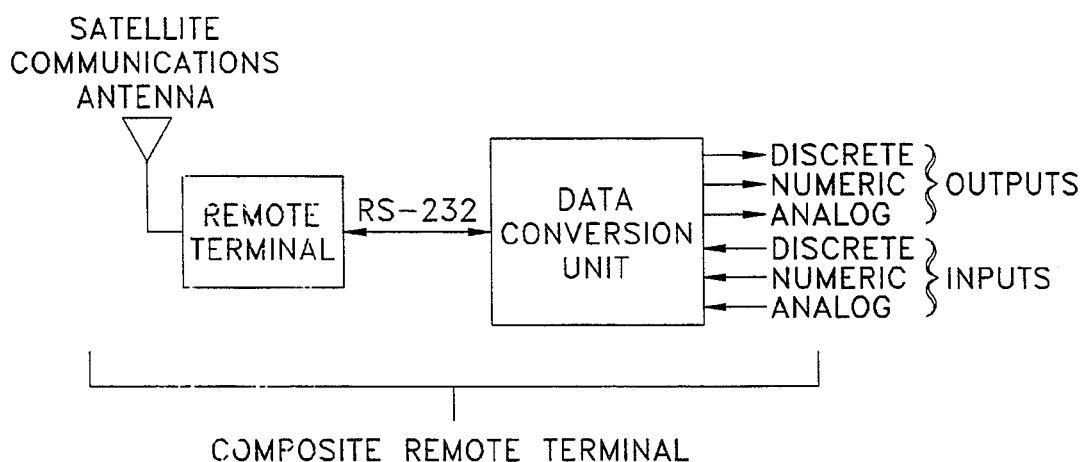
FIG. 13 shows a functional block diagram of the composite remote terminal unit.

Retrieval of data rapidly collected and stored in response to a transient event is possible. The remote terminal can incorporate the data conversion unit within the same package. FIG. 13 shows a functional block diagram of the composite remote terminal unit. The data conversion unit has the capability to collect and store a 12 bit data item every 10 microseconds. A set of signals is defined as a group. The group may consist of any number of input or time data. Each element of the group is stored consecutively in memory. When storage of the group is completed, the process is repeated for the same set of data. The storage rate is controllable up to a maximum of 10 microseconds per data element.

The memory within the data conversion unit is configured as multiple stacks. The number of stacks and the size of each stack is configured over the network. A data group is associated with each stack. The data defined by the group are pushed on top of the stack. Once the stack is filled, the new data, pushed on top of the stack, causes the same quantity of old data to be pushed off the bottom of the stack. Old data can be discarded.

A trigger is associated with each stack. The activation of this trigger causes the storage process to stop for the associated stack. Also associated with each stack is a time delay . The storage process stops after the time delay relative to the trigger's transition to the active state. The time delay controls the amount of data remaining in the stack after trigger activation versus before trigger activation.

Figure 14:
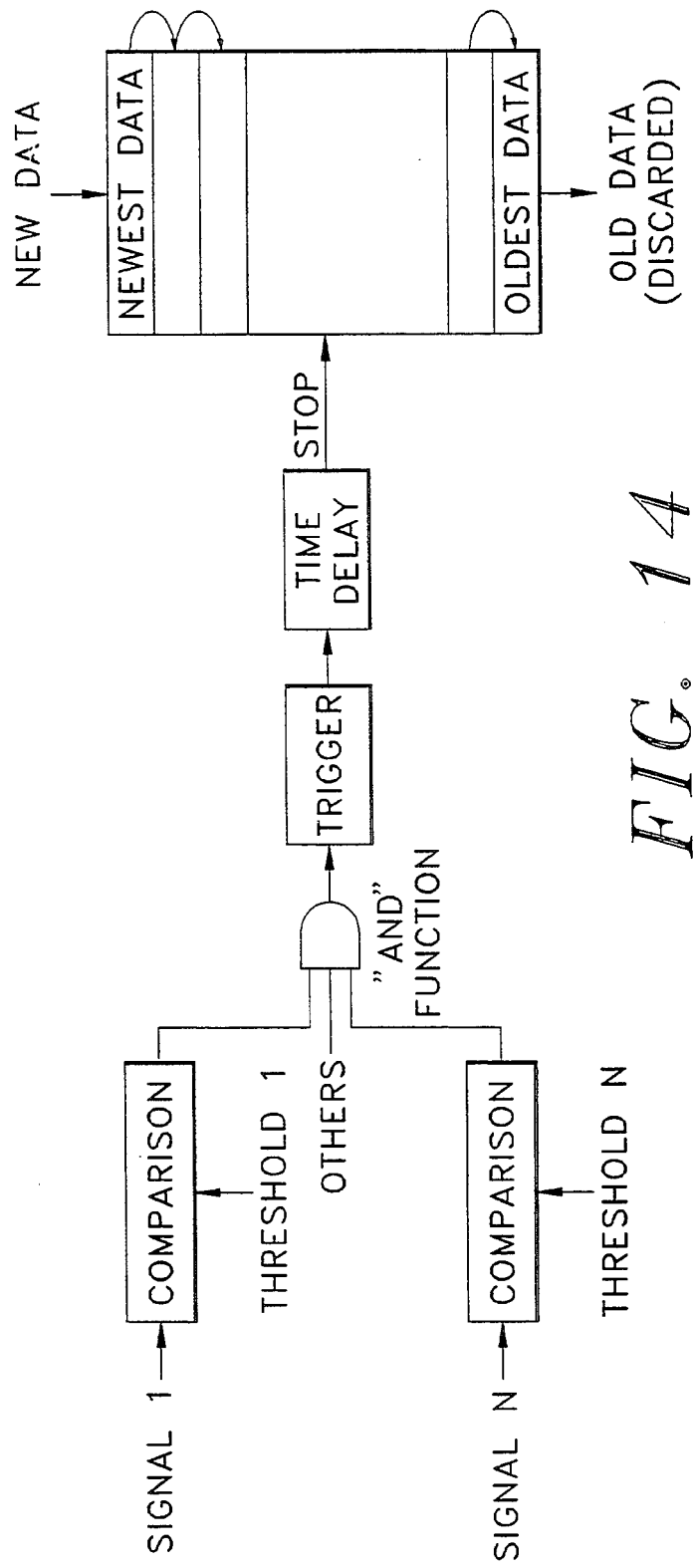
FIG. 14 is a block diagram showing a representation of data storage for transient analysis.

One or more control conditions are associated with each trigger. Each control condition is associated with a threshold value, signal number and profile mask. The signal, as defined by the signal number, is compared to the threshold. The profile mask determines the type of comparison. The mask includes lower than, equal to, greater than, was greater but now lower and was lower but now higher comparisons of the signal to the threshold. The control condition is designated as active if any one or more of the mask criteria are satisfied. The trigger is designated as active when all of its associated control conditions are simultaneously active. FIG. 14 shows a representation of the data storage process.

Triggers are designated as non-retriggerable or retriggerable. If non-retriggerable, once the trigger is activated and the corresponding data storage is stopped, no further actions are taken until a reset is issued over the network. If retriggerable, upon the completion of the actions associated with the trigger, a new stack is allocated automatically to allow for the storage of data associated with the reoccurrence of that trigger. The new allocations occur until memory is entirely allocated.

At each network poll, the remote terminal response message identifies the triggers that have occurred and the amount of data stored. The network may then request the stored data to be transferred to the hub terminal on subsequent polls. In addition, each trigger is designated as to whether its activation should generate an emergency notification as described earlier. For those triggers, the hub terminal is immediately notified of the activation of the corresponding trigger. The data groups, data storage rate, triggers, time delay, control conditions and stack allocations are all reprogrammable over the network.

General

The utility of the present invention is enhanced by incorporation of the integrated control center approach. For electric utilities, the overall status of the systems monitored and controlled by the communication network are simultaneously displayed on a computerized video screen. The location of the remote terminals are displayed, superimposed on a schematic of the electrical power system. The schematic representations are displayed in correct geographical relationship to allow superposition of a road map on the screen. The dynamic location of the mobile remote terminals is also superimposed.

Many other forms of the invention exist, each differing from this in matters of detail only. The invention has application to many different communication systems in its different aspects in part or in whole.

The scope of the invention is to be determined solely by the following claims.

We claim:
1. A communication system using satellite repeaters comprising
   (a) at least two satellite repeaters,
   (b) at least one hub terminal including antenna means for communicating with each satellite repeater,
   (c) multiple remote terminals including respective antenna means having sufficient beamwidth for illuminating the at least two satellite repeaters simultaneously with multiple signals, the signals representing information in relation to the remote terminals, the remote terminals having respective communication means, and the communications means being nonoperable when the information is not being communicated, (d) the signals being spread spectrum encoded thereby to reduce peak power spectral density, and (e) the hub terminal and the multiple remote terminals communicating signals simultaneously through the at least two satellites.

2. A communication system comprising
(a) a geostationary satellite repeater,
(b) a hub terminal including antenna means for communicating with the repeater,
(c) a mobile remote terminal including
 (i) an antenna of sufficient gain to require steering to the direction of the satellite repeater, such antenna being for data communication between the remote terminal and hub terminal;
 (ii) a GPS receiver, the receiver operating on a GPS reference frequency as a reference frequency for the remote terminal to receive signals from the satellite repeater, and the GPS receiver being for acquisition processing with the satellite repeater and not for data communication between the hub terminal and mobile remote terminal, and
(d) means for deriving a GPS local position and time for facilitating spread spectrum code phase acquisition of communicated signals.

3. A communication system comprising
(a) a satellite repeater,
(b) a hub terminal including antenna means for communicating with the repeater,
(c) a remote terminal,
(d) means for transmitting a waveform from the hub terminal to the remote terminal incorporating a precision time frame, such time frame being applied for coarse time distribution resolution, and
(e) means for generating spread spectrum code phase communicated signals from the hub terminal to the remote terminal, such signals being applied for fine resolution by providing a time distribution corresponding to the duration of one bit of the spread spectrum code sequence.

4. A communication system for signals comprising
(a) means for code multiplexing direct sequence spread spectrum encoded signals to obtain a composite signal,
(b) means for conversion of a received composite signal to a numerical database,
(c) means for processing the database to establish the code phase and frame synchronization,
(d) means for demodulating an embedded signal using the database,
the means (a), (b), (c) and (d) being included in a communication system having
(e) at least one satellite repeater,
(f) a hub terminal including antenna means for communicating with the repeater, and
(g) a remote terminal including communication means for periodic operation.

5. A communication system for signals comprising
(a) means for code multiplexing direct sequence spread spectrum encoded signals,
(b) means for conversion of a received composite received signal to a numerical database,
(c) means for processing the database to establish the code phase and frame synchronization for the relatively stronger signals,
(d) means for demodulating an embedded relatively stronger signal using the database,
(e) means for smoothing and respreading of the demodulated relatively stronger signal to establish values for that relatively stronger signal at each sample time within the database,
(f) means for subtracting the demodulated signals from the original database,
(g) means for performing these processes iteratively and thereby affecting demodulation of less strong signals,
(h) the means (a), (b), (c), (d), (e), (f) and (g) being included in a communication system having
(i) at least one satellite repeater,
(j) a hub terminal including antenna means for communicating with the repeater, and
(k) a remote terminal including communication means for periodic operation.

6. A communication system comprising
(a) a hub terminal,
(b) multiple remote terminals,
(c) means for polling the remote terminals to initiate responses from the terminals,
(d) means for changing the polling sequence,
(e) means for establishing multiple blocks,
(f) means for assigning selected remote terminals to be members of selected blocks,
(g) means for polling by block thereby selecting all members assigned to that block,
(h) means for polling by multiple blocks, individually additive or subtractive, thereby affecting selection of numerous combinations of remote terminals, and
(i) means for effecting communication including at least one satellite repeater, and the hub terminal including antenna means for communicating with the repeater, and wherein the remote terminals including respective communication means, the communication means being periodically operable.

7. A communication system comprising
(a) a hub terminal,
(b) multiple remote terminals,
(c) means for polling the remote terminals to initiate responses from the terminals, and
(d) means for transmission of notifications independent of the polling sequence using a combination of code and time multiplexing, and
(e) means for effecting communication including at least one satellite repeater, and wherein the hub terminal includes antenna means for communicating with the repeaters, the hub terminal including communication means, and wherein the remote terminals include respective communication means, the communication means being periodically operable.

8. A communication system adjacent to electrical power conductors comprising
(a) a hub terminal including antenna means, the hub terminal including a communication,
(b) a remote terminal including communication means for communicating continuously,
(c) at least one geostationary satellite repeater for receiving communications between the hub terminal and the remote terminal such that communication is effected through the one satellite repeater, (d) an electrical power supply source for the remote terminal, the source being non-conductively coupled with an electrical power conductor between the remote terminal and a selected site, and (e) a steerable antenna incorporated into the remote terminal to provide self-alignment of the antenna with the direction to the satellite.

9. A communication system comprising (a) a hub terminal including antenna means, the hub terminal including a communication means, (b) a remote terminal including communication means for communicating with the hub terminal and periodically transmitting data to the hub, (c) at least one geostationary satellite repeater for receiving communications between the hub terminal and the remote terminal such that communication is effected through at least one satellite repeater, (d) an electrical power generating source for the remote terminal, the source being physically disconnected from electrical power supply means, (e) a communication link for data transfer between the remote terminal and a selected site, (f) an antenna for the remote terminal, (g) a remote terminal mounted with an adjustable joint, (h) installation means for automatically adjusting the orientation of the remote terminal by control of the adjustable joint, and (i) a GPS receiver used selectively solely or in combination with gyroscope means for determining orientation and direction of the antenna alignment relative to the satellite repeater.

10. A communication system comprising (a) a hub terminal including antenna means, the hub terminal including a communication means, (b) at least one remote terminal for communicating data to the hub terminal, the data being related to varying information, the remote terminal including communication means for communicating through at least one satellite repeater with the hub terminal and periodically communicating data to the hub such that communication is effected through at least one satellite repeater, (c) means for collecting and storing a programmable amount of data before, during and after a transient event related to the varying information, (d) a programmable size memory stack, (e) means for storing data by introducing new data to the stack and for removing old data from the stack, (f) means for defining control conditions relating to the varying information, such conditions being determined by a past and a present signal level relative to selected threshold values, and (g) a trigger responsive to at least one of the control conditions, and being operable selectively under predetermined programmable conditions to terminate data storage.

11. The system as claimed in claim 6 including means for enabling a terminal to transmit data without regard to the polling sequence, and including means for multiplexing direct sequence spread spectrum encoded signals from the remote terminals.

12. The system as claimed in claim 2 including means for dynamically assigning selected remote terminals to be members of selected blocks.

13. The system as claimed in claim 4 including a single chain of RF, IF and downconversion means for demodulating multiple code multiplexed direct sequence spread spectrum encoded signals of conversion of the composite signal to a numerical database, and means for separating signals by digital signal processing of the numerical database.

14. The system as claimed in claim 5 including a single chain of RF IF and downconversion means for demodulating multiple code multiplexed direct sequence spread spectrum encoded signals of conversion of the composite signal to a numerical database, and means for separating signals by digital signal processing of the numerical database.

15. The system as claimed in claim 3 including means for selectively forward error-correction encoding each frame, and means for notifying the receiving terminal whether the forward error-correction is used by affixing a selected preamble to the start of the frame.

16. The system as claimed in claim 4 including means for selectively forward error-correction encoding each frame, and means for notifying the receiving terminal whether the forward error-correction is used by affixing a selected preamble to the start of the frame.

17. The system as claimed in claim 5 including means for selectively forward error-correction encoding each frame, and means for notifying the receiving terminal whether the forward error-correction is used by affixing a selected preamble to the start of the frame.

18. The system as claimed in claim 4 including means for obtaining a high signal to noise ratio of a transmitted signal and substantial immunity to the effects of signal scintillation having:

(a) means for determining code phase tracking error by performing a simultaneous cross-correlation of the same signal with the spread spectrum code sequence shifted earlier and later in time, (b) means for using the maximum correlation, early correlation and late correlation of the same signal to control code phase tracking, and (c) means for using the maximum correlation data for subsequent signal processing.

19. The system as claimed in claim 5 including means for obtaining a high signal to noise ratio of a transmitted signal and substantial immunity to the effects of signal scintillation having;

(a) means for determining code phase tracking error by performing a simultaneous cross-correlation of the same signal with the spread spectrum code sequence shifted earlier and later in time, (b) means for using the maximum correlation, early correlation and late correlation of the same signal to control code phase tracking, and (c) means for using the maximum correlation data for subsequent signal processing.

20. A system as claimed in claim 1 wherein the satellite repeaters are geostationary.

21. A system as claimed in claim 2 wherein there are multiple remote terminals, the remote terminals being selectively mobile.

22. A system as claimed in claim 21 wherein the GPS reference frequency selectively calibrates the remote terminals.

23. A system as claimed in claim 3 wherein the satellite repeater is geostationary, and wherein there are selectively multiple site remote terminals, the terminals being selectively fixed or mobile.

24. A system as claimed in claim 7 wherein the power source is selectively a solar array panel or induction coil interaction with power supply lines.

25. A system as claimed in claim 7 including means for monitoring an apparent increase in noise level resulting from numerous, simultaneous notifications, and means for limiting the increase in apparent noise level by activating additional time multiplexing of the notifications.

26. A system as claimed in claim 7 including means for activating additional time multiplexing through block addressing control of enable, disable and synchronization of periodic transmissions of polling and response to polling.

27. A system as claimed in claim 8 including means for operating the trigger after a programmable time delay.

28. A communication system using satellite repeaters comprising
   (a) at least two geostationary satellite repeaters,
   (b) at least one hub terminal including antenna means for communicating with each satellite repeater, the hub terminal including a communication means,
   (c) multiple mobile remote terminals including respective antenna means having a wide beamwidth for illuminating the at least two satellite repeaters simultaneously with a signal, the antennas having sufficient gain to require steering to the direction of the satellite repeater; and GPS receiver means, the receiver means being operated on a GPS reference frequency as a reference frequency for the remote terminal to receive signals from the satellite repeater,
   (d) satellite repeater RF power means for amplifying the signal, the signal being spread spectrum encoded thereby to reduce peak power spectral density, and
   (e) means for deriving a GPS derived local position and time for facilitating spread spectrum code phase acquisition of communicated signals, and
   (f) the remote terminals including communication means for communicating with the hub terminal and periodically transmitting data to the hub such that communication is effected through at least one satellite repeater.

29. A communication system using satellite repeaters comprising
   (a) at least two satellite repeaters,
   (b) at least one hub terminal including antenna means for communicating with each satellite repeater, a hub terminal including continuously operating communication means,
   (c) multiple remote terminals including respective antenna means having a wide beamwidth for illuminating the at least two satellite repeaters simultaneously with a signal,
   (d) means for transmitting a waveform incorporating a precision time frame, such time frame being applied for coarse time distribution resolution, and
   (e) means for generating spread spectrum code phase communicated signals, such signals being applied for fine resolution by providing a time distribution corresponding to the duration of bit of the spread spectrum code sequence, and
   (f) the remote terminals including communication means for communicating with the hub terminal and for periodically transmitting data to the hub such that communication is effected simultaneously through the two satellite repeaters thereby establishing a redundancy of signal communication with the hub terminal and periodically transmitting data to the hub.

30. A communication system using satellite repeaters comprising
   (a) at least two satellite repeaters,
   (b) at least two hub terminals including antenna means for communicating with each satellite repeater, each hub terminal including a communication means,
   (c) multiple remote terminals including respective antenna means having a wide beamwidth for illuminating the at least two satellite repeaters simultaneously with a signal,
   (d) means for code multiplexing direct sequence spread spectrum encoded signals to obtain a composite signal,
   (e) means for conversion of a received composite signal to a numerical database,
   (f) means for processing the database to establish the code phase and frame synchronization, and
   (g) means for demodulating an embedded signal using the database, and
   (h) the remote terminals including communication means for communicating with the hub terminal and periodically transmitting data to the hub such that communication is effected simultaneously through the two satellite repeaters thereby establishing a redundancy of signal communications with the hub terminals and periodically transmitting data to the hub.

31. A communication system using satellite repeaters comprising
   (a) at least two satellite repeaters,
   (b) at least one hub terminal including antenna means for communicating with each satellite repeater, the hub terminal including a communication means,
   (c) multiple remote terminals including respective antenna means having a wide beamwidth for illuminating the at least two satellite repeaters simultaneously with a signal,
   (d) means for code multiplexing direct sequence spread spectrum encoded signals,
   (e) means for conversion of a received composite received signal to a numerical database,
   (f) means for processing the database to establish the code phase and frame synchronization, the processing rapidly acquiring stronger signals by direct demodulation of the stronger signals.
   (g) means for demodulating an embedded signal using the database, wherein the process will rapidly decode the stronger signals,
   (h) means for smoothing and respreading of the successfully demodulated signal to establish values for that signal at each sample time within the database,
   (i) means for subtracting the successfully demodulated signals from the original database, and
   (j) means for performing these processes iteratively and thereby effecting demodulation of other weaker signals, and
   (k) the remote terminals including communication means for communicating with the hub terminals and periodically transmitting data to the hub such that communication is effected simultaneously through the two satellite repeaters thereby establishing a redundancy of signal communications with the hub terminals and periodically transmitting data to the hub.

32. A communication system using satellite repeaters comprising
(a) at least two satellite repeaters,
(b) at least one hub terminal including antenna means for communicating with each satellite repeater, the hub terminal including communication means,
(c) multiple remote terminals including respective antenna means having a wide beamwidth for illuminating the at least two satellite repeaters simultaneously with a signal, the signal being spread spectrum encoded,
(d) means for polling the remote terminals to initiate responses from the terminals,
(e) means for changing the polling sequence,
(f) means for establishing multiple blocks,
(g) means for assigning selected remote terminals to be members of selected blocks,
(h) means for polling by block thereby selecting members assigned to that block, and
(i) means for polling by multiple blocks, individually additive or subtractive, thereby affecting selection of numerous combinations of remote terminals, and
(j) the remote terminals including transmitter means for communicating with the hub terminals and periodically transmitting data to the hub such that communication is effected simultaneously through the two satellite repeaters thereby establishing a redundancy of signal communication with the hub terminals and periodically transmitting data to the hub.

33. A communication system using satellite repeaters comprising
(a) at least two satellite repeaters,
(b) at least one hub terminal including antenna means for communicating with each satellite repeater, the hub terminal including continuously operating communication means,
(c) multiple remote terminals including respective antenna means having a wide beamwidth for illuminating the at least two satellite repeaters simultaneously with a signal,
(d) means for collecting and storing of a programmable amount of data before, during and after a transient event related to data of a varying information,
(e) a programmable size memory stack,
(f) means for storing date by introducing new data on the stack and for removing old date from the stack,
(g) means a for defining control conditions relating to the varying information, such conditions being determined by a past and a present signal level relative to selected threshold values,
(h) a trigger responsive to at least one of the control conditions, and being operable selectively under programmable conditions to terminate data storage, and
(i) the remote terminals including communication means for communicating with the hub terminal and periodically transmitting data to the hub such that communication is effected simultaneously through the two satellite repeaters thereby establishing a redundancy of signal communication with the hub terminal and periodically transmitting data to the hub.

34. A communication system using satellite repeaters comprising
(a) at least two geostationary satellite repeaters,
(b) at least two hub terminals including antenna means for communicating with each satellite repeater, the respective hub terminals including communication means,
(c) at least one electronic means for association with the hub terminals for processing signals between the antenna means and the hub terminal,
(d) multiple remote terminals including respective antenna means having sufficient beamwidth for illuminating the at least two satellite repeaters simultaneously with a signal,
(e) the signal being spread spectrum encoded thereby to reduce peak power spectral density,
(f) means for switching at a preselected time from a first selected satellite repeater and a selected hub terminal to a second selected satellite repeater and a selected hub terminal, and
(g) the remote terminals including communication means for communicating continuously with the hub terminal and periodically transmitting data to the hub such that communication is effected simultaneously through the two satellite repeaters thereby establishing a redundancy of signal communication with the hub terminal and periodically transmitting data to the hub.

35. A system as claimed in claim 34 wherein the electronic means is common for the hub terminals and including means for connecting the electronic means with the selected hub terminal.

36. A system as claimed in claim 34 wherein the preselected time is sun outage time between a selected satellite repeater and the respective antenna means.

37. A method of communicating using satellite repeaters comprising
(a) communicating with at least two satellite repeaters,
(b) communicating from at least one hub terminal with each satellite repeaters, each hub terminal including a continuously operating communication means,
(c) communicating a signal from multiple remote terminals with a wide beamwidth with the at least two satellite repeaters simultaneously,
(d) the signal being spread spectrum encoded thereby to reduce peak power spectral density, and
(e) communicating with the hub terminal and periodically transmitting data to the hub such that communication is effected simultaneously through the two satellite repeaters thereby establishing a redundancy of signal communication with the hub terminal and periodically transmitting data to the hub.

38. A method of communicating comprising
(a) communicating with at least two satellite repeaters,
(b) communicating from a hub terminal with the repeaters, and wherein the hub terminal includes a communication means,
(c) communicating a signal from a remote terminal, including having communication means for communicating simultaneously with the two satellite repeaters,
(d) transmitting a waveform incorporating a precision time frame, such time frame being applied for coarse time distribution resolution,
(e) generating spread spectrum code phase communicated signals, such signals being applied for fine resolution by providing a time distribution corresponding to the duration of one bit of the spread spectrum code sequence, and (f) communicating with the hub terminal and periodically transmitting data to the hub such that communication is effected simultaneously through the two satellite repeaters thereby establishing a redundancy of signal communication with the hub terminal and periodically transmitting data to the hub.

39. A method of communicating comprising
(a) communicating with a satellite repeater,
(b) communicating from a hub terminal with the repeater, the hub terminal including a communication means,
(c) generating spread spectrum code phase communicated signals, such signals being applied for fine resolution by providing a time distribution corresponding to the duration of one bit of the spread spectrum code sequence,
(d) communicating a signal from a remote terminal, the remote terminal including communication means for periodically transmitting data to the hub, and
(e) transmitting a waveform incorporating a precision time frame, such time frame being applied for coarse time distribution resolution.

40. A method of communicating for signals comprising
(a) code multiplexing direct sequence spread spectrum encoded signals to obtain a composite signal,
(b) converting a received composite signal to a numerical database,
(c) processing the database to establish the code phase and frame synchronization,
(d) demodulating of an embedded signal using the database,
(e) effecting communication using a satellite repeater comprising communicating with at least one satellite repeater, communicating from at least one hub terminal with the satellite repeater, the hub terminals including communication means, and communicating a signal from multiple remote terminals, each respective remote terminal including communication means for communication with the satellite repeaters, and
(f) periodically transmitting data to the hub through the satellite repeaters.

41. A method of communicating for signals comprising
(a) code multiplexing direct sequence spread spectrum encoded signals,
(b) converting a received composite received signal to a numerical database,
(c) processing the database to establish the code phase and frame synchronization, such that the processing rapidly acquires the stronger signals by direct demodulation,
(d) demodulating an embedded signal using the database, recognizing that the process will rapidly decode the stronger signals,
(e) smoothing and respreading of the successfully demodulated signal to establish values for that signal at each sample time within the database,
(f) subtracting the successfully demodulated signals from the original database,
(g) performing these processes iteratively and thereby effecting demodulation of other weaker signals, and
(h) effecting communication using a satellite repeater comprising communicating with at least one satellite repeater, communicating from at least one hub terminal with the satellite repeater, the hub terminals including communication means, and communicating a signal from multiple remote terminals, each respective remote terminal including communication means for communication with the satellite repeater and,
(i) the remote terminals including transmitter means for periodically transmitting data to the hub through the satellite repeater.

42. A method of communicating comprising,
(a) polling multiple remote terminals from a hub terminal to initiate responses from the terminals,
(b) changing the polling sequence,
(c) establishing multiple blocks,
(d) assigning selected remote terminals to be members of selected blocks,
(e) polling by block thereby selecting all members assigned to that block,
(f) polling by multiple blocks, individually additive or subtractive, thereby effecting selection of numerous combinations of remote terminals,
(g) effecting communication using a satellite repeater comprising communicating with at least one satellite repeater, communicating from at least the hub terminal with the satellite repeater, the hub terminal including communication means, and
(h) periodically transmitting data to the hub through the satellite repeater.

43. A method of communicating between a hub terminal, a remote terminal and at least one geostationary satellite repeater comprising
(a) supplying an electrical power generating source for the remote terminal, the source being physically disconnected from electrical power supply means,
(b) communicating data between the remote terminal and a selected site,
(c) steering a steerable antenna for the remote terminal to provide antenna alignment or using external automated installation means including a GPS receiver selectively in combination with gyroscope means to effect alignment of the antenna,
(d) effecting communication using satellite repeaters comprising communicating with at least one satellite repeater, communicating from at least the hub terminal with the satellite repeater, the hub terminals including communication means, and
(e) periodically transmitting data to the hub through the satellite repeater.

44. A method of communicating comprising
(a) collecting and storing of a programmable amount of data before, during and after a transient event related to the varying information,
(b) providing a programmable size memory stack,
(c) storing data by introducing new data to the stack and removing old data from the stack,
(d) defining control conditions relating to the varying information, such conditions being determined by a past and a present signal level relative to selected threshold values,
(e) triggering in response to at least one of the control conditions, and being operable selectively under programmable conditions to terminate data storage,
(f) effecting communication using a satellite repeater comprising communicating with at least one satellite repeater, communicating from at least the hub terminal with the satellite repeater, the hub terminals including communication means, and (g) periodically transmitting data to the hub through the satellite repeater.

45. The method as claimed in claim 44 including enabling a terminal to transmit data without regard to the polling sequence including multiplexing direct sequence spread spectrum encoded signals from the remote terminals.

46. The method as claimed in claim 42 including applying a single chain of RF, IF and downconversion for demodulating multiple code multiplexed direct sequence spread spectrum encoded signals by conversion of the composite signal to a numerical database, and separating signals by digital signal processing of the numerical database.

47. The method as claimed in claim 43 including applying a single chain of RF, IF and downconversion for demodulating multiple code multiplexed direct sequence spread spectrum encoded signals by conversion of the composite signal to a numerical database, and separating signals by digital signal processing of the numerical database.

48. The method as claimed in claim 42 including selectively forward error-correction encoding each frame, and notifying the receiving terminal whether the forward error-correction is used by affixing a selected preamble to the start of the frame.

49. The method as claimed in claim 42 including selectively forward error-correction encoding each frame, and notifying the receiving terminal whether the forward error-correction is used by affixing a selected preamble to the start of the frame.

50. The method as claimed in claim 44 including selectively forward error-correction encoding each frame, and notifying the receiving terminal whether the forward error-correction is used by affixing a selected preamble to the start of the frame.

51. The method as claimed in claim 42 including obtaining a high signal to noise ratio of a transmitted signal and substantial immunity to the effects of signal scintillation including:
   (a) determining code phase tracking error by performing a simultaneous cross-correlation of the same signal with the spread spectrum code sequence shifted earlier and later in time,
   (b) using the maximum correlation, early correlation and late correlation of the same signal to control code phase tracking, and
   (c) using the maximum correlation data for subsequent signal processing.

52. The method as claimed in claim 43 including obtaining a high signal to noise ratio of a transmitted signal and substantial immunity to the effects of signal scintillation having;
   (a) determining code phase tracking error by performing a simultaneous cross-correlation of the same signal with the spread spectrum code sequence shifted earlier and later in time,
   (b) using the maximum correlation, early correlation and late correlation of the same signal to control code phase tracking, and
   (c) using the maximum correlation data for subsequent signal processing.

53. A method as claimed in claim 39 wherein the satellite repeaters are geostationary.

54. A method as claimed in claim 40 wherein there are multiple remote terminals, the remote terminals being selectively mobile.

55. A method as claimed in claim 54 wherein the GPS reference frequency selectively calibrates the remote terminals.

56. A method as claimed in claim 41 wherein the satellite repeater is geostationary, and wherein there are selectively multiple terminals, the terminals being selectively fixed or mobile.

57. A method as claimed in claim 45 wherein the power source is selectively from solar or induction coil interaction with power supply lines.

58. A method as claimed in claim 47 including operating the trigger after a programmable time delay.

59. A method as claimed in claim 42 including dynamically assigning selected remote terminals to be members of selected blocks.

60. A method of communicating using satellite repeaters comprising
   (a) communicating with at least two geostationary satellite repeaters,
   (b) communicating from at least one hub terminal with each satellite repeater, the hub terminal including communication means,
   (c) communicating a signal from multiple remote terminals with the at least two satellite repeaters simultaneously, and steering the antenna to the direction of the satellite repeater,
   (d) applying a GPS receiver operating on a GPS reference frequency as a reference frequency for the remote terminal to receive signals from the satellite repeater,
   (e) using a GPS derived local position and time for facilitating spread spectrum code phase acquisition of communicated signals, and
   (f) effecting communication continuously and simultaneously through at least one satellite repeater thereby establishing a redundancy of signal communication.

61. A method of communicating using satellite repeaters comprising
   (a) communicating with at least two satellite repeaters,
   (b) communicating from at least one hub terminal with each satellite repeater, the hub terminal including a transmitter,
   (c) communicating a signal from multiple remote terminals with the at least two satellite repeaters simultaneously,
   (d) transmitting a waveform incorporating a precision time frame, such time frame being applied for coarse time distribution resolution,
   (e) generating spread spectrum code phase communicated signals, such signals being applied for fine resolution by providing a time distribution corresponding to the duration of one bit of the spread spectrum code sequence, and
   (f) effecting communication through at least one satellite repeater thereby establishing a redundancy of signal communication.

62. A method of communicating using satellite repeaters comprising
   (a) communicating with at least two satellite repeaters,
   (b) communicating from at least one hub terminal with each satellite repeater, the hub terminal including communication means, (c) communicating a signal from multiple remote terminals with the at least two satellite repeaters simultaneously, (d) code multiplexing direct sequence spread spectrum encoded signals to obtain a composite signal, (e) converting of a received composite signal to a numerical database, (f) processing the database to establish the code phase and frame synchronization, (g) demodulating an embedded signal using the database and (h) effecting communication through at least one satellite repeater thereby establishing a redundancy of signal communication.

63. A method of communicating using satellite repeaters comprising (a) communicating with at least two satellite repeaters, (b) communicating from at least one hub terminal including antenna means for communicating with each satellite repeater, the hub terminal including communication means, (c) communicating a signal, the signal being spread spectrum encoded from multiple remote terminals antenna means with the at least two satellite repeaters simultaneously, (d) code multiplexing direct sequence spread spectrum encoded signals, (e) converting a received composite received signal to a numerical database, (f) processing the database to establish the code phase and frame synchronization, for relatively stronger signals, (g) demodulating an embedded signal using the database, for the relatively stronger signals, (h) smoothing and respreading of the successfully demodulated signal to establish values for that signal at each sample time within the database, (i) subtracting the successfully demodulated signals from the original database, (j) performing these processes iteratively and thereby effecting demodulation of relatively less strong signals, and (k) effecting communication through at least one satellite repeater thereby establishing a redundancy of signal communication.

64. A method of communicating using satellite repeaters comprising (a) communicating with at least two satellite repeaters, (b) communicating from at least one hub terminal with each satellite repeater, the hub terminal including communication means, (c) communicating a signal from multiple remote terminals with the at least two satellite repeaters simultaneously with a signal, (d) amplifying the signal with satellite repeater RF power, the signal being spread spectrum encoded, (e) polling the remote terminals to initiate responses from the terminals, (f) changing the polling sequence, (g) establishing multiple blocks, (h) assigning selected remote terminals to be members of selected blocks, (i) polling by block thereby selecting all members assigned to that block, (j) polling by multiple blocks, individually additive or subtractive, thereby affecting selection of numerous combinations of remote terminals, and (k) effecting communication through at least one satellite repeater thereby establishing a redundancy of signal communication.

65. A method of communicating using satellite repeaters comprising (a) communicating with at least two satellite repeaters, (b) communicating from at least one hub terminal with each satellite repeater, the hub terminal including communication means, (c) communicating a signal, the signal being spread spectrum encoded with multiple remote terminals with the at least two satellite repeaters simultaneously, (d) collecting and storing of a programmable amount of data before, during and after a transient event related to data of a varying information, (e) providing a programmable size memory stack, (f) storing data by introducing new data on the stack and removing old data from the stack, (g) defining control conditions relating to the varying information, such conditions being determined by a past and a present signal level relative to selected threshold values, (h) triggering in response to at least one of the control conditions, and being operable selectively under programmable conditions to terminate data storage, and (i) effecting communication through at least one satellite repeater thereby establishing redundancy of signal communication.

66. A method of communicating using satellite repeaters comprising (a) communicating with at least two geostationary satellite repeaters, (b) communicating from at least two hub terminals with each satellite repeater, the hub terminal including communication means, (c) communicating a signal from multiple remote terminals with a wide beamwidth with the at least two satellite repeaters simultaneously, (d) amplifying the signal with satellite repeater RF power means, (e) the signal being spread spectrum encoded thereby to reduce peak power spectral density, (f) switching at a preselected time from a first selected satellite repeater and a selected hub terminal to a second satellite repeater and a selected hub terminal, and (g) effecting communication through at least one satellite repeater thereby establishing a redundancy of signal communication.

67. A method as claimed in claim 66 wherein the preselected time is a sun outage time between a selected satellite repeater and a selected hub terminal.

68. A communication system using satellite repeaters comprising (a) at least two satellite repeaters, (b) at least one hub terminal including antenna means for communicating with each satellite repeater, the hub terminal including a continuously operating transmitter, (c) multiple remote terminals including respective antenna means having sufficient beamwidth for illuminating the at least two satellite repeaters simultaneously with multiple signals, (d) the signals being spread spectrum encoded thereby to reduce power spectral density, and (e) the hub terminal and the multiple remote terminals communicating signals simultaneously through at least one satellite repeater, the communication between the remote terminals and the satellite repeaters being effected by an antenna steered with steering means thereby to maintain a substantially constant orientation in space directed to the satellite repeaters, and wherein the antenna beams between the repeaters and the remote terminals are nondifferentially directed to cellular terrestrial regions.

69. A communication system as claimed in claim 1 including steering means associated with the antenna means of the remote terminals, the steering means acting to facilitate constant orientation between the satellite repeaters and the remote terminals, and wherein the antenna beam between the satellite repeaters and the remote terminals is not based on differential beams over different discreetly located cellular terrestrial regions about remote terminals.

70. A communication system using satellite repeaters comprising (a) at least two satellite repeaters, (b) at least one hub terminal including antenna means for communicating with each satellite repeater, the hub terminal including a continuously operating transmitter, (c) multiple remote terminals including respective antenna means having sufficient beamwidth for illuminating the at least two satellite repeaters simultaneously with multiple signals, (d) the signals being spread spectrum encoded thereby to reduce power spectral density, and (e) the hub terminal and the multiple remote terminals communicating signals simultaneously through at least one satellite repeater, and wherein communication of the existence of activity is independent of a monitoring of communication activity between the hub terminal, repeaters and remote terminals.

71. A communication system as claimed in claim 1 wherein communication between the satellite repeaters, hub terminal and remote terminals is independent of a monitoring of communication activity between the hub terminal repeater and remote terminals.

72. A communication system using satellite repeaters comprising (a) at least two satellite repeaters, (b) at least one hub terminal including antenna means for communicating with each satellite repeater, the hub terminal including a continuously operating transmitter, (c) multiple remote terminals including respective antenna means having sufficient beamwidth for illuminating the at least two satellite repeaters simultaneously with multiple signals, (d) the signals being spread spectrum encoded thereby to reduce power spectral density, and (e) the hub terminal and the multiple remote terminals communicating signals simultaneously through the at least two satellite repeaters and including means for code phase tracking and carrier tracking on a communication signal, such communication signal directed between the hub terminal satellite repeaters and remote terminals, such tracking being effected without a pilot spread spectrum sequence.

73. A communication system as claimed in claim 1 including means for code phase tracking and carrier tracking between the satellite repeaters, hub terminal and remote terminal, such tracking being effected on the communication signal between the repeaters and terminals.

74. A communication system using satellite repeaters comprising (a) at least two satellite repeaters, (b) at least one hub terminal including antenna means for communicating with each satellite repeater, the hub terminal including continuously operating communication means, (c) multiple remote terminals including respective antenna means having sufficient beamwidth for illuminating the at least two satellite repeaters simultaneously with multiple signals, (d) the signals being spread spectrum encoded thereby to reduce power spectral density, and (e) the hub terminal and the multiple remote terminals communicating signals simultaneously through the at least two satellite repeaters, and including means to address signals between all remote terminals and the hub terminal, the communication signal between the terminals and repeaters including data representative of the address whereby the hub terminal includes means for receiving and decoding all communication signals transmitted by the remote terminals, and wherein all remote terminals decode all information transmitted by the hub terminal, the respective remote terminal having means to selectively distinguish signals intended for a selected remote terminal.

75. A communication system as claimed in claim 1 including means for communicating all signals to all hub terminals, and remote terminals, and including means in the hub terminal for receiving signals from all remote terminals and for selectively distinguishing signals from different remote terminals, and including means in the remote terminals for receiving all the hub signals and selecting signals intended for a selected, remote terminal.

76. A method of communicating using satellite repeaters comprising (a) at least two satellite repeaters, (b) at least one hub terminal including antenna means for communicating with each satellite repeater, the hub terminal including continuously operating communication means, (c) multiple mobile remote terminals including respective antenna means having sufficient beamwidth for illuminating the at least two satellite repeaters simultaneously with multiple signals, (d) the signals being spread spectrum encoded thereby to reduce power spectral density, and (e) the hub terminal and the multiple remote terminals communicating signals simultaneously through the at least two satellite repeaters, the communication between the remote terminals and the satellite repeaters being effected by an antenna steered with steering means thereby to maintain a substantially constant orientation in space directed to the satellite repeaters, and wherein the antenna beams between the repeaters and the remote terminals are nondifferentially directed to cellular terrestrial regions.

77. A method of communicating as claimed in claim 37 including steering the antenna means of the remote mobile terminals, the steering acting to facilitate constant orientation between the satellite repeaters and the remote terminals, and wherein the antenna beam between the satellite repeaters and the remote terminals is not based on differential beams over different discreetly located cellular terrestrial regions about remote terminals.

78. A method of communicating using satellite repeaters comprising
  (a) at least two satellite repeaters,
  (b) at least one hub terminal including antenna means for communicating with each satellite repeater, the hub terminal including continuously operating communication means,
  (c) multiple remote terminals including respective antenna means having sufficient beamwidth for illuminating the at least two satellite repeaters simultaneously with multiple signals,
  (d) the signals being spread spectrum encoded thereby to reduce power spectral density, and
  (e) the hub terminal and the multiple remote terminals communicating signals simultaneously through at least two satellite repeaters, and wherein communication of activity is independent of monitoring communication activity between the hub terminal, repeaters and remote terminals.

79. A method of communicating as claimed in claim 37 wherein communication between the satellite repeaters, hub terminals and remote terminals is independent of monitoring communication activity between the hub terminal repeaters and remote terminals.

80. A method of communicating using satellite repeaters comprising
  (a) at least two satellite repeaters,
  (b) at least one hub terminal including antenna means for communicating with each satellite repeater, the hub terminal including a communication means,
  (c) multiple remote terminals including respective antenna means having sufficient beamwidth for illuminating the at least two satellite repeaters simultaneously with multiple signals,
  (d) the signals being spread spectrum encoded thereby to reduce power spectral density, and
  (e) the hub terminal and the multiple remote terminals communicating signals simultaneously through the at least two satellite repeaters and including means for code phase tracking and carrier tracking on a communication signal, such communication signal directed between the hub terminal satellite repeaters and remote terminals, such tracking being effected without a pilot spread spectrum sequence.

81. A method of communicating as claimed in claim 37 including means for code phase tracking and carrier tracking between the satellite repeaters, hub terminal and remote terminal, such tracking being effected on the communication signal between the repeaters and terminals.

82. A method of communicating using satellite repeaters comprising
  (a) at least two satellite repeaters,
  (b) at least one hub terminal including antenna means for communicating with each satellite repeater, the hub terminal including continuously operating communication means,
  (c) multiple remote terminals including respective antenna means having sufficient beamwidth for illuminating the at least two satellite repeaters simultaneously with multiple signals,
  (d) the signals being spread spectrum encoded thereby to reduce power spectral density, and
  (e) the hub terminal and the multiple remote terminals communicating signals simultaneously through the at least two satellite repeaters, and including means to address signals between all remote terminals and the hub terminal, the communication signal between the terminals and repeaters including data representative of the address whereby the hub terminal includes means for receiving and decoding all communication signals transmitted by the remote terminals, and wherein all remote terminals decode all information transmitted by the hub terminal, the respective remote terminal having means to selectively distinguish signals intended for a selected remote terminal.

83. A method of communicating as claimed in claim 37 including communicating all signals to all hub terminals, and remote terminals, and including receiving signals in the hub terminal from all remote terminals and for selectively distinguishing signals from different remote terminals, and including receiving all the hub signals in all the remote terminals and selecting signals intended for a selective, remote terminal.

84. A communication system for signals comprising
  (a) means for code multiplexing direct sequence spread spectrum encoded signals to obtain a composite signal,
  (b) means for conversion of a received composite signal to a numerical database,
  (c) means for processing the database to establish the code phase and frame synchronization,
  (d) means for demodulating an embedded signal using the database,
  the means (a), (b), (c) and (d) being included in a communication system having
  (e) at least two satellite repeaters,
  (f) a hub terminal including antenna means for communicating with the repeater, the hub terminal including continuously operating communication means, and
  (g) a remote terminal including communication means for periodic operation and wherein communication is effected simultaneously through the two satellite repeaters thereby to establish a redundancy of signal communication.

85. A communication system for signals comprising
  (a) means for code multiplexing direct sequence spread spectrum encoded signals,
  (b) means for conversion of a received composite received signal to a numerical database,
  (c) means for processing the database to establish the code phase and frame synchronization for the relatively stronger signals,
  (d) means for demodulating an embedded relatively stronger signal using the database,
  (e) means for smoothing and respreading of the demodulated relatively stronger signal to establish values for that relatively stronger signal at each sample time within the database,
  (f) means for subtracting the demodulated signals from the original database,
  (g) means for performing these processes iteratively and thereby effecting demodulation of less strong signals,
  the means (a), (b), (c), (d), (e), (f) and (g) being included in a communication system having
  (h) at least two satellite repeaters, (i) a hub terminal including antenna means for communicating with the repeater, the hub terminal including a continuously operating communication means, and (j) a remote terminal including communication means for periodic operation wherein communicating is effected simultaneously through the two satellite repeaters thereby to establish a redundancy of signal communication.

86. A communication system comprising (a) a hub terminal, (b) multiple remote terminals, (c) means for polling the remote terminals to initiate responses from the terminals, (d) means for changing the polling sequence, (e) means for establishing multiple blocks, (f) means for assigning selected remote terminals to be members of selected blocks, (g) means for polling by block thereby selecting all members assigned to that block, (h) means for polling by multiple blocks, individually additive or subtractive, thereby effecting selection of numerous combinations of remote terminals, and (i) means for effecting communication including at least two satellite repeaters, and the hub terminal including antenna means for communicating with the repeaters, the hub terminal including continuously operating communication means, and wherein the remote terminals each include respective communication means, the transmitters being periodically operable such that communication is effected simultaneously through the two satellite repeaters thereby to establish a redundancy of signal communication.

87. A communication system comprising (a) a hub terminal, (b) multiple remote terminals, (c) means for polling the remote terminals to initiate responses from the terminals, (d) means for transmission of notifications independent of the polling sequence using a combination of code and time multiplexing, and (e) means for effecting communication including at least two satellite repeaters, and wherein the hub terminal includes antenna means for communicating with the repeaters, the hub terminal including continuously operating communication means, and wherein the remote terminals include respective communication means, the communication means being periodically operable, such that communication is effected simultaneously through the two satellite repeaters thereby to establish a redundancy of signal communication.

88. A communication system comprising (a) a hub terminal including antenna means, the hub terminal including communication means, (b) at least one remote terminal for communicating data to the hub terminal, the data being related to varying information, the remote terminal including communication means for communicating through at least two satellite repeaters with the hub terminal and periodically transmitting data to the hub such that communication is effected simultaneously through the two satellite repeaters thereby establishing a redundancy of signal communication, (c) means for collecting and storing a programmable amount of data before, during and after a transient event related to the varying information, (d) a programmable size memory stack, (e) means for storing data by introducing new data to the stack and for removing old data from the stack, (f) means for defining control conditions relating to the varying information, such conditions being determined by a past and a present signal level relative to selected thereshold values, and (g) a trigger responsive to at least one of the control conditions, and being operable selectively under predetermined programmable conditions to terminate data storage.

89. A communication system using satellite repeaters comprising (a) at least two geostationary satellite repeaters, (b) at least one hub terminal including antenna means for communicating with each satellite repeater, the hub terminal including continuously operating communication means, (c) multiple remote terminals including respective antenna means having a wide beamwidth for illuminating the at least two satellite repeaters simultaneously with a spread spectrum encoded signal for reducing peak power spectral density, the antennas having sufficient gain to require steering to the direction of the satellite repeater; and GPS receiver means, the receiver means being operated on a GPS reference frequency as a reference frequency for the remote terminal to receive signals from the satellite repeater, (d) means for deriving a GPS derived local position and time for facilitating spread spectrum code phase acquisition of communicated signals, and (e) remote terminals including communication means for communicating with the hub terminal and periodically transmitting data to the hub such that communication is effected simultaneously through the two satellite repeaters thereby establishing a redundancy of signal communication with the hub terminal and periodically transmitting data to the hub.

90. A communication system using satellite repeaters comprising (a) at least two satellite repeaters, (b) at least two hub terminals including antenna means for communicating with each satellite repeater, (c) multiple remote terminals including respective antenna means having sufficient beamwidth for illuminating the at least two satellite repeaters simultaneously with multiple signals, the signals representing only information in relation to the remote terminals, the remote terminals having respective communication means, and the transmitters being nonoperable when the information is not being transmitted, (d) the signals being spread spectrum encoded thereby to reduce peak power spectral density, and (e) the hub terminals and the multiple remote terminals communicating signals simultaneously through at least one of the two satellites, in the event of radiation from the sun impacting communication through the second satellite.

91. A communication system comprising (a) a hub terminal, (b) multiple remote terminals, (c) means for polling the remote terminals to initiate responses from the terminals, (d) means for changing the polling sequence, (e) means for establishing multiple blocks, (f) means for assigning selected remote terminals to be members of selected blocks and for selectively changing the assignment of remote terminals in selected blocks, (g) means for polling by block thereby selecting all members assigned to that block, (h) means for polling by multiple blocks, individually additive or subtractive, thereby affecting selection of numerous combinations of remote terminals, and (i) means for effecting communication including at least one satellite repeater, and the hub terminal including antenna means for communicating with the repeater, and wherein the remote terminals including respective communication means, the transmitters being periodically operable.

92. A communication system as claimed in claim 91 including means at the hub for sensing signal strength from the remote terminals and for effecting change in assignment based on the sensed strength thereby to retain signals of a substantially similar signal strength in respective blocks.

93. A system as claimed in claim 29 including means for obtaining from GPS receiver a timing signal thereby to prevent signal interference during communication.

94. A system as claimed in claim 31 including means for effecting demodulation separately of the weaker signal.

95. A system as claimed in claim 2 including at least two satellite repeaters and wherein the mobile remote terminals include antenna means having sufficient beamwidth for illuminating the at least two satellite repeaters simultaneously.

96. A system as claimed in claim 1 wherein the communication means includes at least one of a transmitter and a receiver.

97. A system as claimed in claim 4 wherein the communication means includes at least one of a transmitter and a receiver.

98. A system as claimed in claim 5 wherein the communication means includes at least one of a transmitter and a receiver.

99. A system as claimed in claim 6 wherein the communication means includes at least one of a transmitter and a receiver.

100. A system as claimed in claim 7 wherein the communication means includes at least one of a transmitter and a receiver.

101. A system as claimed in claim 9 wherein the communication means includes at least one of a transmitter and a receiver.

102. A system as claimed in claim 10 wherein the communication means includes at least one of a transmitter and a receiver.

103. A system as claimed in claim 33 wherein the communication means includes at least one of a transmitter and a receiver.

104. A system as claimed in claim 37 wherein the communication means includes at least one of a transmitter and a receiver.

105. A system as claimed in claim 9 including means at a hub terminal for detecting a communication failure from a remote terminal, and means for ascertaining the location of the failed remote terminal by data relating a GPS signal with the remote terminal.

106. A system as claimed in claim 1 wherein the beamwidth is sufficiently broad thereby to compensate for movement of remote terminals due to earthquake movement.

107. A system as claimed in claim 30 wherein rapid acquiring of signals include means for applying a least square fit of a carrier frequency thereby to compensate for frequency drift.

108. A system as claimed in claim 1 wherein the communication through the at least two satellite effects communication between the hub terminal and remote terminal without signal loss between the hub terminal and remote terminals.

109. A system as claimed in claim 28 wherein the communication through the at least two satellite repeaters effects communication between the hub terminal and remote terminal without signal loss between the hub terminal and remote terminals.

110. A system as claimed in claim 29 wherein the communication through the at least two satellite effects communication between the hub terminal and remote terminal without signal loss between the hub terminal and remote terminals.

111. A system as claimed in claim 30 wherein the communication through the at least two satellite effects communication between the hub terminal and remote terminal without signal loss between the hub terminal and remote terminals.

112. A system as claimed in claim 31 wherein the communication through the at least two satellite effects communication between the hub terminal and remote terminal without signal loss between the hub terminal and remote terminals.

113. A system as claimed in claim 1 including means at the hub terminal for decoding signals from the multiple remote terminals substantially simultaneously.

114. A system as claimed in claim 6 including means at the hub terminal for decoding signals from the multiple remote terminals substantially simultaneously.

115. A system as claimed in claim 7 including means at the hub terminal for decoding signals from the multiple remote terminals substantially simultaneously.

116. A system as claimed in claim 3 including means for applying a GPS signal with the spread spectrum communicated signal thereby to minimize differences in the same distribution of the communicated signals between the hub terminal and the remote terminal.

117. A system as claimed in claim 2 wherein communication is effected without means for recovering a carrier frequency.

* * * * *

UNITED STATES PATENT AND TRADEMARK OFFICE
CERTIFICATE OF CORRECTION

PATENT NO. : 5,379,320

DATED : January 3, 1995

INVENTOR(S) : Fernandes et al.

It is certified that error appears in the above-identified patent and that said Letters Patent is hereby corrected as shown below:

Column 2, line 59, delete "kbps" and insert --bps-- therefor.
Column 3, line 60, delete "filmed" and insert --fixed-- therefor.
Column 5, line 29, delete "TDM/" and insert --TDMA-- therefor.
Column 6, line 64, after "antenna" insert --2--.
Column 10, line 6, delete "dBi" and insert --dB-- therefor; line 32, delete "dBi" and insert --dB-- therefor.
Column 17, line 35, delete "he" and insert --the-- therefor.
Column 19, line 16, after "cross-correlator" delete the word "correlator".
Column 20, line 22, delete the word "from".
Column 25, line 2, delete "communications" and insert --communication-- therefor.
Column 32, line 37, delete "repeaters" and insert --repeater-- therefor; line 46, delete "date" and insert --data-- therefor; line 47, delete "date" and insert --data-- therefor.
Column 43, line 6, delete "communicating" and insert --communication-- therefor.

Signed and Sealed this

Tenth Day of October, 1995

Attest:

BRUCE LEHMAN

Attesting Officer

Commissioner of Patents and Trademarks